United States Patent
Chen et al.

(10) Patent No.: US 12,425,642 B2
(45) Date of Patent: Sep. 23, 2025

(54) ZERO MOTION VECTOR IN ADAPTIVE REORDERING OF MERGE CANDIDATES (ARMC)

(71) Applicant: Tencent America LLC, Palo Alto, CA (US)

(72) Inventors: Lien-Fei Chen, Hsinchu (TW); Guichun Li, San Jose, CA (US); Xiang Li, Saratoga, CA (US); Shan Liu, San Jose, CA (US)

(73) Assignee: Tencent America LLC, Palo Alto, CA (US)

( * ) Notice: Subject to any disclaimer, the term of this patent is extended or adjusted under 35 U.S.C. 154(b) by 103 days.

(21) Appl. No.: 18/135,222

(22) Filed: Apr. 17, 2023

(65) Prior Publication Data

US 2023/0336774 A1     Oct. 19, 2023

Related U.S. Application Data

(60) Provisional application No. 63/332,066, filed on Apr. 18, 2022.

(51) Int. Cl.
*H04N 19/176*     (2014.01)
*H04N 19/105*     (2014.01)
(Continued)

(52) U.S. Cl.
CPC ......... *H04N 19/573* (2014.11); *H04N 19/105* (2014.11); *H04N 19/139* (2014.11);
(Continued)

(58) Field of Classification Search
CPC .... H04N 19/156; H04N 19/52; H04N 19/176; H04N 19/105; H04N 19/139;
(Continued)

(56) References Cited

U.S. PATENT DOCUMENTS

| | | | |
|---|---|---|---|
| 10,362,330 B1 * | 7/2019 | Li | H04N 19/44 |
| 2021/0037238 A1 * | 2/2021 | Park | H04N 19/105 |
| 2025/0016361 A1 * | 1/2025 | Zhang | H04N 19/109 |

OTHER PUBLICATIONS

International Search Report issued Aug. 4, 2023 in Application No. PCT/US2023/065893 (12 pages).
(Continued)

*Primary Examiner* — Tsion B Owens
(74) *Attorney, Agent, or Firm* — ArentFox Schiff LLP

(57) ABSTRACT

Aspects of the disclosure provide a method and an apparatus including processing circuitry that adds merge candidates into a merge candidate list of a current block in a current picture. The merge candidates include available merge candidates including one or more of spatial motion vector predictors (MVP(s)), temporal MVP(s), non-adjacent MVP(s), history-based MVP(s), and pairwise average MVP(s). Whether the merge candidate list includes all available SMVP, TMVP, NA-MVP, HMVP, and PAMVP, and no merge candidate in the merge candidate list has a zero motion vector (zero MV) are determined. If the merge candidate list includes all available SMVP, TMVP, NA-MVP, HMVP, and PAMVP, and no merge candidate in the merge candidate list has the zero MV, the merge candidate having the zero MV is added to the merge candidate list. Merge candidates in the merge candidate list including the merge candidate having the zero MV are reordered using template matching.

15 Claims, 12 Drawing Sheets

(51) Int. Cl.
*H04N 19/139* (2014.01)
*H04N 19/156* (2014.01)
*H04N 19/172* (2014.01)
*H04N 19/52* (2014.01)
*H04N 19/573* (2014.01)
*H04N 19/88* (2014.01)

(52) U.S. Cl.
CPC ......... *H04N 19/156* (2014.11); *H04N 19/172* (2014.11); *H04N 19/176* (2014.11); *H04N 19/52* (2014.11); *H04N 19/88* (2014.11)

(58) Field of Classification Search
CPC .... H04N 19/88; H04N 19/577; H04N 19/573; H04N 19/172
See application file for complete search history.

(56) References Cited

OTHER PUBLICATIONS

High Efficiency Video Coding, Rec. ITU-T H.265 v4 Dec. 2016, pp. 1-664.
ITU-T and ISO/IEC, "Versatile Video Coding", ITU-T Rec. H.266 and ISO/IEC 23090-3, 2020, pp. 1-516.
Y.-J. Chang, et. al., "Compression efficiency methods beyond WC", ISO/IEC JTC1/SC29/WG11 JVET-U0100, Jan. 2021, pp. 1-13.
V. Seregin, et. al., "Exploration Experiment on Enhanced Compression beyond VVC capability", ISO/IEC JTC1/SC29/WG11 JVET-U2024, Jan. 2021, pp. 1-19.
Y.-W. Chen, et al., "Description of SDR, HDR and 360° video coding technology proposal by Qualcomm and Technicolor—low and high complexity versions", ISO/IEC JTC1/SC29/WG11 JVET-J0021, Apr. 2018, pp. 1-43.
Y. Han, W.-J. Chien, H. Huang, and M. Karczewicz, "CE4.4.6: Improvement on Merge/Skip mode", ISO/IEO JTC1/SC29/WG11 JVET-L0399, Jul. 2018, pp. 1-6.
N. Zhang, K. Zhang, L. Zhang, H. Liu, Z. Deng, Y. Wang, "AHG12: Adaptive Reordering of Merge Candidates with Template Matching," ISO/IEC JTC1/SC29/WG11 JVET-V0099, Apr. 2021, pp. 1-4.
Y.-J. Chang, et. al., "EE2-3.4, EE2-3.5, EE2-3.6: Experimental results of the MV candidates reordering in candidate types based on template matching costs", ISO/IEC JTC1/SC29/WG11 JVET-Y0134, Jan. 2022, pp. 1-5.
G. Laroche, P. Onno, and R. Bellessort, "Correction of the ARMC re-ordering step regarding the zero candidates", JVET-Z0102, ISO/IEO JTC1/SC29/WG11 JVET-Z0102, Apr. 2022, pp. 1-3.

* cited by examiner

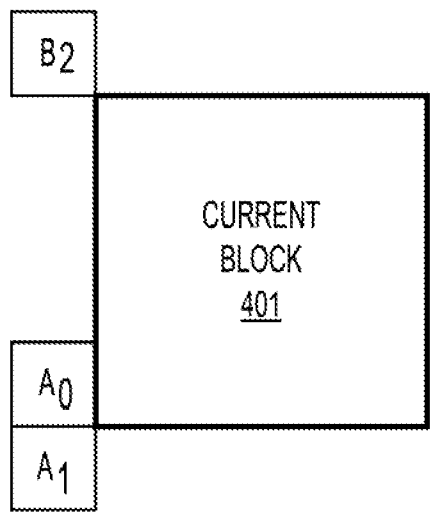
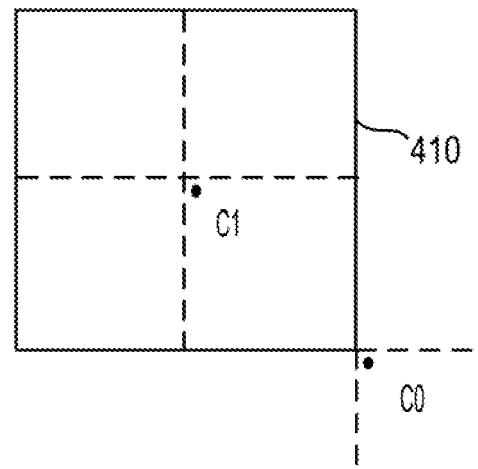
FIG. 4A  FIG. 4B
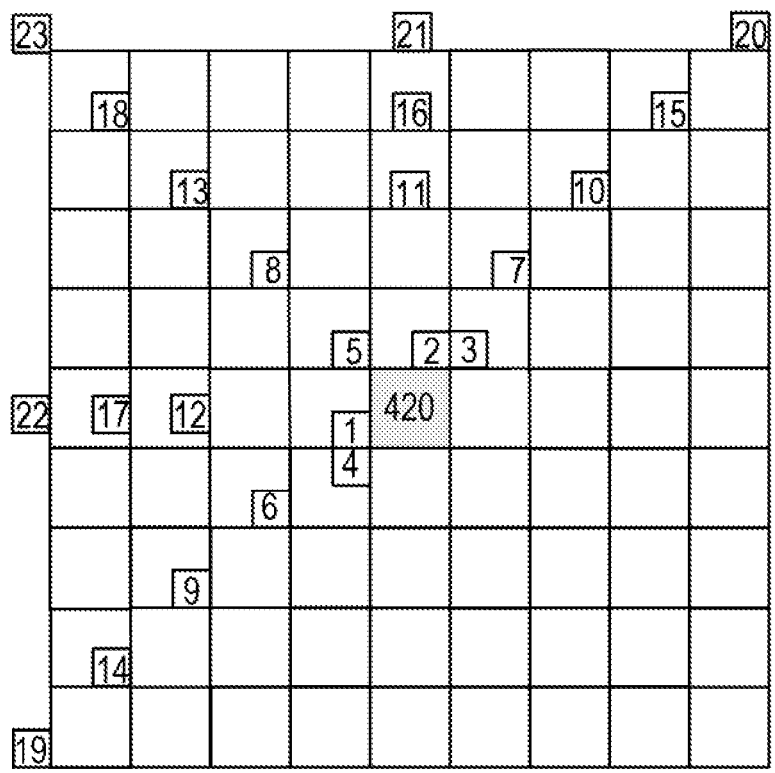
FIG. 4C

Merge Candidate List

Cand0 = A1
Cand1 = B1
Cand7 = Tempo
Cand8 = Non-ADJ3
Cand9 = Pairwise
Cand2 = Zero1
Cand3 = Zero1
Cand4 = Zero1
Cand5 = Zero1
Cand6 = Zero1

— ARMC —

Reordered Merge Candidate List

NewCand0 = A1
NewCand1 = B1
NewCand2 = Tempo
NewCand3 = Pairwise
NewCand4 = Non-ADJ3
NewCand5 = Zero1
NewCand6 = Zero1
NewCand7 = Zero1
NewCand8 = Zero1
NewCand9 = Zero1

ZERO MOTION VECTOR IN ADAPTIVE REORDERING OF MERGE CANDIDATES (ARMC)

INCORPORATION BY REFERENCE

The present application claims the benefit of priority to U.S. Provisional Application No. 63/332,066, "Zero Motion Vector In Adaptive Reordering Of Merge Candidates (ARMC)" filed on Apr. 18, 2022, which is incorporated by reference herein in its entirety.

TECHNICAL FIELD

The present disclosure describes embodiments generally related to video coding.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Image/video compression can help transmit image/video files across different devices, storage, and networks with minimal quality degradation. In some examples, video codec technology can compress video based on spatial and temporal redundancy. In an example, a video codec can use techniques referred to as intra prediction that can compress images based on spatial redundancy. For example, the intra prediction can use reference data from the current picture under reconstruction for sample prediction. In another example, a video codec can use techniques referred to as inter prediction that can compress image based on temporal redundancy. For example, the inter prediction can predict samples in a current picture from previously reconstructed picture with motion compensation. The motion compensation is generally indicated by a motion vector (MV).

SUMMARY

Aspects of the disclosure provide methods and apparatuses for video encoding and decoding. In some examples, an apparatus for video decoding includes processing circuitry. The processing circuitry can add merge candidates into a merge candidate list of a current block in a current picture. The merge candidates can include available merge candidates including one or more of (i) at least one spatial motion vector predictors (MVP) (SMVP), (ii) at least one temporal MVP (TMVP), (iii) at least one non-adjacent MVP (NA-MVP), (iv) at least one history-based MVP (HMVP), and (v) at least one pairwise average MVP (PAMVP). The processing circuitry can determine whether the merge candidate list includes a merge candidate having a zero motion vector (MV). If the merge candidate list does not include a merge candidate having a zero MV, the merge candidate having the zero MV can be added to the merge candidate list. The processing circuitry can perform adaptive reordering of merge candidates (ARMC) with template matching (TM) on the merge candidate list including the merge candidate having the zero MV and reconstruct the current block based on the reordered merge candidate list.

In an embodiment, a video bitstream comprising the current block in the current picture is received.

In an embodiment, whether (1) the merge candidate list includes all available SMVP, TMVP, NA-MVP, HMVP, and PAMVP, and (2) no merge candidate in the merge candidate list has a zero motion vector (zero MV) are determined. In response to a determination (1) that the merge candidate list includes all available SMVP, TMVP, NA-MVP, HMVP, and PAMVP, and (2) that no merge candidate in the merge candidate list has the zero MV, the merge candidate having the zero MV can be added to the merge candidate list. The merge candidates in the merge candidate list including the merge candidate having the zero MV can be reordered using template matching (TM).

In an embodiment, the processing circuitry selects a merge candidate from the reordered merge candidate list that includes the merge candidate having the zero MV, and reconstructs the current block based on the selected merge candidate.

In an embodiment, the processing circuitry determines TM costs corresponding to each merge candidate in the merge candidate list including the merge candidate having the zero MV. Each TM cost can be determined based on a current template of the current block and a reference template in a reference picture corresponding to a respective merge candidate. The processing circuitry can reorder the merge candidate list including the merge candidate having the zero MV based on the determined TM costs.

In an example, the merge candidate list is determined to include the merge candidate having the zero MV if one of conditions is satisfied. The conditions can be defined as (i) one of the merge candidates in the merge candidate list being a merge candidate for uni-prediction that has the zero MV associated with a reference picture in a first reference picture list or a second reference picture list, and (ii) one of the merge candidates in the merge candidate list being a merge candidate for bi-prediction that has (a) the zero MV associated with the reference picture in the first reference picture list and (b) another zero MV associated with a reference picture in the second reference picture list. The merge candidate list can be determined not to include the merge candidate having the zero MV if none of the conditions is satisfied.

In an example, the merge candidate having the zero MV is added to the merge candidate list. At least one reference index of the added merge candidate having the zero MV is 0.

In an example, the merge candidate having the zero MV is added to the merge candidate list. A reference index of the added merge candidate having the zero MV can indicate a reference picture in a reference picture list. An absolute value of a picture order count (POC) difference between the reference picture and the current picture is the smallest among POC differences between the current picture and reference pictures of the current picture.

In an example, the merge candidate having the zero MV and another zero MV is added to the merge candidate list. A reference index associated with the zero MV indicates a first reference picture in a first reference picture list, a reference index associated with the other zero MV indicates a second reference picture in a second reference picture list, the current picture is a bi-predicted picture, and the first reference picture and the second reference picture are available.

In an embodiment, the processing circuitry can determine whether the merge candidate list includes a merge candidate having a first zero MV and a second zero MV associated with a reference picture in a first reference picture list and a reference picture in a second reference picture list, respectively. If the merge candidate list is determined not to include the merge candidate that has the first zero MV and the second zero MV, the merge candidate having the first zero MV and the second zero MV can be added to the merge candidate list. The processing circuitry can perform ARMC with TM on the merge candidate list including the merge candidate having the first zero MV and the second zero MV and reconstruct the current block based on the reordered merge candidate list.

In an example, a merge candidate is selected based on the reordered merge candidate list including the first zero MV and the second zero MV. The current block can be reconstructed based on the selected merge candidate.

In an example, TM costs corresponding to each merge candidate in the merge candidate list including the merge candidate having the first zero MV and the second zero MV can be determined. Each TM cost can be determined based on a current template of the current block and a reference template in a reference picture corresponding to a respective merge candidate. The merge candidate list including the merge candidate having the first zero MV and the second zero MV can be reordered based on the determined TM costs.

In an example, a first reference index associated with the first zero MV indicates the reference picture in the first reference picture list, and a second reference index associated with the second zero MV indicates the reference picture in the second reference picture list.

In an example, at least one of the first reference index or the second reference index is 0.

In an example, the first reference index is a reference index of a first reference picture in the first reference picture list, and an absolute value of a picture order count (POC) difference between the first reference picture and the current picture is the smallest among POC differences between the current picture and reference pictures in the first reference picture list. In an example, the second reference index is a reference index of a second reference picture in the second reference picture list, and an absolute value of a POC difference between the second reference picture and the current picture is the smallest among POC differences between the current picture and reference pictures in the second reference picture list.

Aspects of the disclosure also provide a non-transitory computer-readable medium storing instructions which when executed by a computer for video decoding cause the computer to perform the methods for video decoding.

BRIEF DESCRIPTION OF THE DRAWINGS

Further features, the nature, and various advantages of the disclosed subject matter will be more apparent from the following detailed description and the accompanying drawings in which:

FIG. 4A shows positions of spatial merge candidates according to an embodiment of the disclosure.

FIG. 4B shows exemplary candidate positions for a temporal merge candidate of a current coding unit.

FIG. 4C shows an exemplary pattern of spatial merge candidates of a current coding block.

FIGS. 7A-7B shows exclusion of zero candidates in an adaptive reordering of merge candidates (ARMC) process according to an embodiment of the disclosure.

DETAILED DESCRIPTION OF EMBODIMENTS

Figure 1:
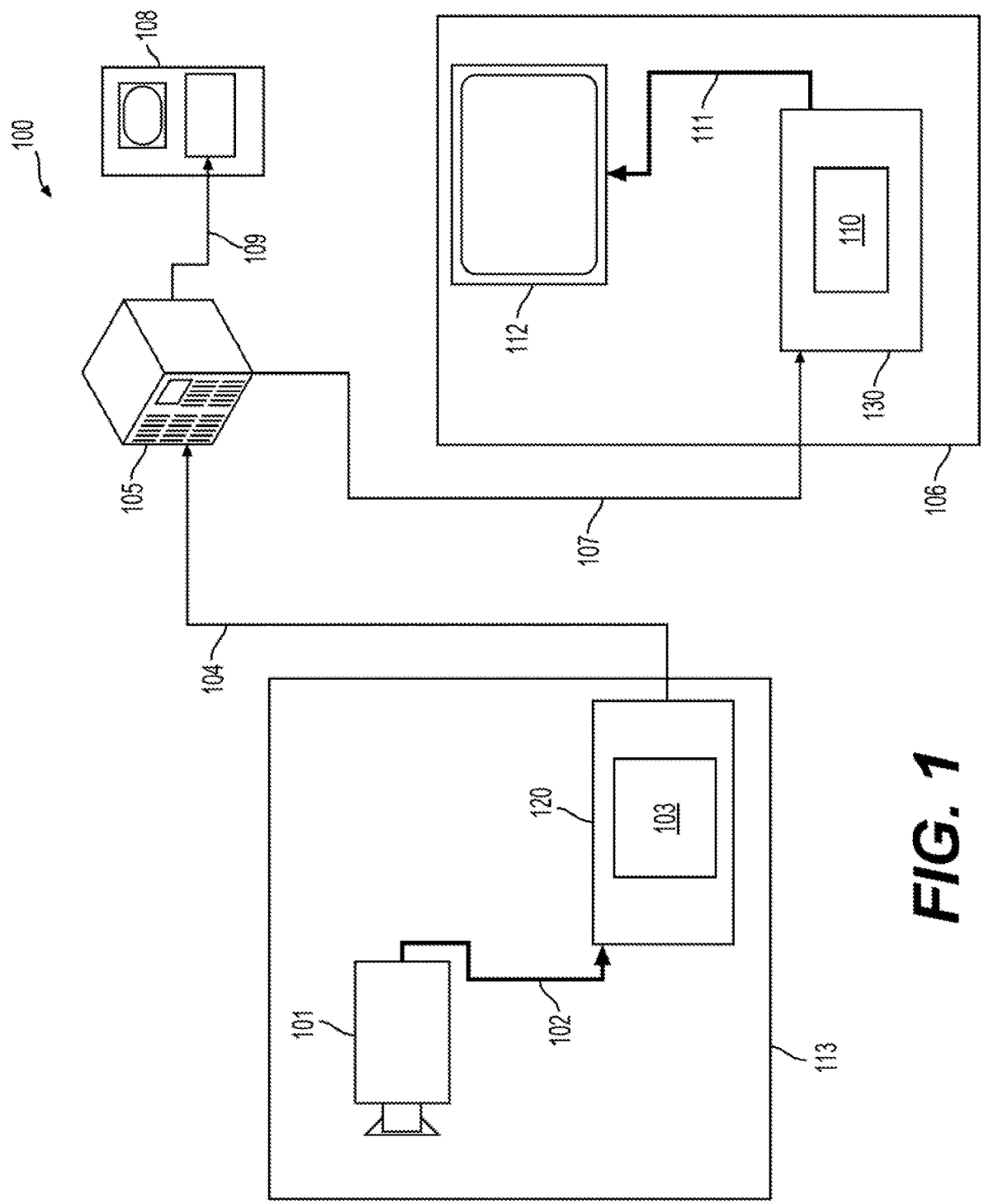
FIG. 1 is a schematic illustration of an exemplary block diagram of a communication system (100).

FIG. 1 shows a block diagram of a video processing system (100) in some examples. The video processing system (100) is an example of an application for the disclosed subject matter, a video encoder and a video decoder in a streaming environment. The disclosed subject matter can be equally applicable to other video enabled applications, including, for example, video conferencing, digital TV, streaming services, storing of compressed video on digital media including CD, DVD, memory stick and the like, and so on.

The video processing system (100) include a capture subsystem (113), that can include a video source (101), for example a digital camera, creating for example a stream of video pictures (102) that are uncompressed. In an example, the stream of video pictures (102) includes samples that are taken by the digital camera. The stream of video pictures (102), depicted as a bold line to emphasize a high data volume when compared to encoded video data (104) (or coded video bitstreams), can be processed by an electronic device (120) that includes a video encoder (103) coupled to the video source (101). The video encoder (103) can include hardware, software, or a combination thereof to enable or implement aspects of the disclosed subject matter as described in more detail below. The encoded video data (104) (or encoded video bitstream), depicted as a thin line to emphasize the lower data volume when compared to the stream of video pictures (102), can be stored on a streaming server (105) for future use. One or more streaming client subsystems, such as client subsystems (106) and (108) in FIG. 1 can access the streaming server (105) to retrieve copies (107) and (109) of the encoded video data (104). A client subsystem (106) can include a video decoder (110), for example, in an electronic device (130). The video decoder (110) decodes the incoming copy (107) of the encoded video data and creates an outgoing stream of video pictures (111) that can be rendered on a display (112) (e.g., display screen) or other rendering device (not depicted). In some streaming systems, the encoded video data (104), (107), and (109) (e.g., video bitstreams) can be encoded according to certain video coding/compression standards.

Examples of those standards include ITU-T Recommendation H.265. In an example, a video coding standard under development is informally known as Versatile Video Coding (VVC). The disclosed subject matter may be used in the context of VVC.

It is noted that the electronic devices (120) and (130) can include other components (not shown). For example, the electronic device (120) can include a video decoder (not shown) and the electronic device (130) can include a video encoder (not shown) as well.

Figure 2:
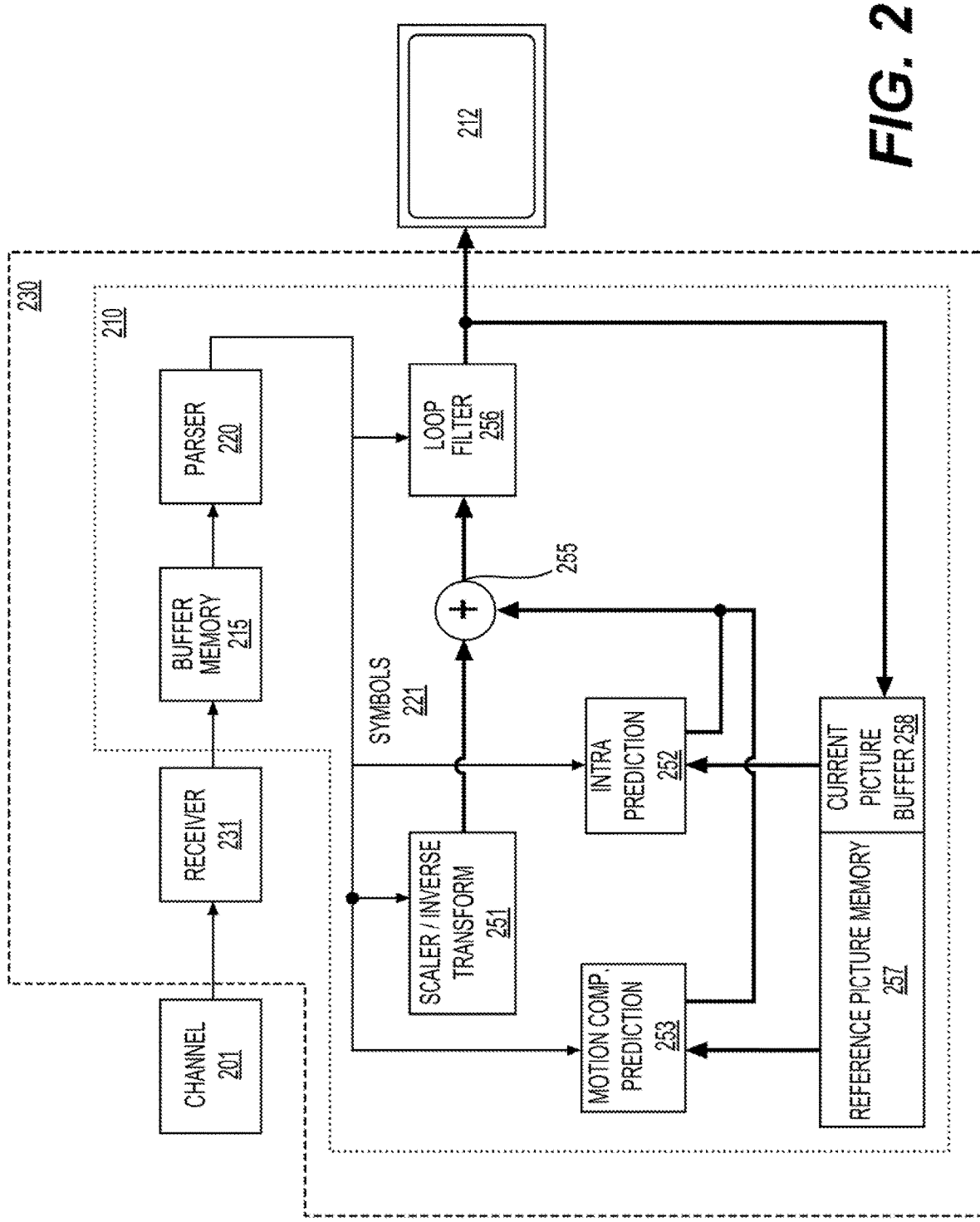
FIG. 2 is a schematic illustration of an exemplary block diagram of a decoder.

FIG. 2 shows an exemplary block diagram of a video decoder (210). The video decoder (210) can be included in an electronic device (230). The electronic device (230) can include a receiver (231) (e.g., receiving circuitry). The video decoder (210) can be used in the place of the video decoder (110) in the FIG. 1 example.

The receiver (231) may receive one or more coded video sequences to be decoded by the video decoder (210). In an embodiment, one coded video sequence is received at a time, where the decoding of each coded video sequence is independent from the decoding of other coded video sequences. The coded video sequence may be received from a channel (201), which may be a hardware/software link to a storage device which stores the encoded video data. The receiver (231) may receive the encoded video data with other data, for example, coded audio data and/or ancillary data streams, that may be forwarded to their respective using entities (not depicted). The receiver (231) may separate the coded video sequence from the other data. To combat network jitter, a buffer memory (215) may be coupled in between the receiver (231) and an entropy decoder/parser (220) ("parser (220)" henceforth). In certain applications, the buffer memory (215) is part of the video decoder (210). In others, it can be outside of the video decoder (210) (not depicted). In still others, there can be a buffer memory (not depicted) outside of the video decoder (210), for example to combat network jitter, and in addition another buffer memory (215) inside the video decoder (210), for example to handle playout timing. When the receiver (231) is receiving data from a store/forward device of sufficient bandwidth and controllability, or from an isosynchronous network, the buffer memory (215) may not be needed, or can be small. For use on best effort packet networks such as the Internet, the buffer memory (215) may be required, can be comparatively large and can be advantageously of adaptive size, and may at least partially be implemented in an operating system or similar elements (not depicted) outside of the video decoder (210).

The video decoder (210) may include the parser (220) to reconstruct symbols (221) from the coded video sequence. Categories of those symbols include information used to manage operation of the video decoder (210), and potentially information to control a rendering device such as a render device (212) (e.g., a display screen) that is not an integral part of the electronic device (230) but can be coupled to the electronic device (230), as shown in FIG. 2. The control information for the rendering device(s) may be in the form of Supplemental Enhancement Information (SEI) messages or Video Usability Information (VUI) parameter set fragments (not depicted). The parser (220) may parse/entropy-decode the coded video sequence that is received. The coding of the coded video sequence can be in accordance with a video coding technology or standard, and can follow various principles, including variable length coding, Huffman coding, arithmetic coding with or without context sensitivity, and so forth. The parser (220) may extract from the coded video sequence, a set of subgroup parameters for at least one of the subgroups of pixels in the video decoder, based upon at least one parameter corresponding to the group. Subgroups can include Groups of Pictures (GOPs), pictures, tiles, slices, macroblocks, Coding Units (CUs), blocks, Transform Units (TUs), Prediction Units (PUs) and so forth. The parser (220) may also extract from the coded video sequence information such as transform coefficients, quantizer parameter values, motion vectors, and so forth.

The parser (220) may perform an entropy decoding/parsing operation on the video sequence received from the buffer memory (215), so as to create symbols (221).

Reconstruction of the symbols (221) can involve multiple different units depending on the type of the coded video picture or parts thereof (such as: inter and intra picture, inter and intra block), and other factors. Which units are involved, and how, can be controlled by subgroup control information parsed from the coded video sequence by the parser (220). The flow of such subgroup control information between the parser (220) and the multiple units below is not depicted for clarity.

Beyond the functional blocks already mentioned, the video decoder (210) can be conceptually subdivided into a number of functional units as described below. In a practical implementation operating under commercial constraints, many of these units interact closely with each other and can, at least partly, be integrated into each other. However, for the purpose of describing the disclosed subject matter, the conceptual subdivision into the functional units below is appropriate.

A first unit is the scaler/inverse transform unit (251). The scaler/inverse transform unit (251) receives a quantized transform coefficient as well as control information, including which transform to use, block size, quantization factor, quantization scaling matrices, etc. as symbol(s) (221) from the parser (220). The scaler/inverse transform unit (251) can output blocks comprising sample values, that can be input into aggregator (255).

In some cases, the output samples of the scaler/inverse transform unit (251) can pertain to an intra coded block. The intra coded block is a block that is not using predictive information from previously reconstructed pictures, but can use predictive information from previously reconstructed parts of the current picture. Such predictive information can be provided by an intra picture prediction unit (252). In some cases, the intra picture prediction unit (252) generates a block of the same size and shape of the block under reconstruction, using surrounding already reconstructed information fetched from the current picture buffer (258). The current picture buffer (258) buffers, for example, partly reconstructed current picture and/or fully reconstructed current picture. The aggregator (255), in some cases, adds, on a per sample basis, the prediction information the intra prediction unit (252) has generated to the output sample information as provided by the scaler/inverse transform unit (251).

In other cases, the output samples of the scaler/inverse transform unit (251) can pertain to an inter coded, and potentially motion compensated, block. In such a case, a motion compensation prediction unit (253) can access reference picture memory (257) to fetch samples used for prediction. After motion compensating the fetched samples in accordance with the symbols (221) pertaining to the block, these samples can be added by the aggregator (255) to the output of the scaler/inverse transform unit (251) (in this case called the residual samples or residual signal) so as to generate output sample information. The addresses within the reference picture memory (257) from where the motion compensation prediction unit (253) fetches prediction samples can be controlled by motion vectors, available to the motion compensation prediction unit (253) in the form of symbols (221) that can have, for example X, Y, and reference picture components. Motion compensation also can include interpolation of sample values as fetched from the reference picture memory (257) when sub-sample exact motion vectors are in use, motion vector prediction mechanisms, and so forth.

The output samples of the aggregator (255) can be subject to various loop filtering techniques in the loop filter unit (256). Video compression technologies can include in-loop filter technologies that are controlled by parameters included in the coded video sequence (also referred to as coded video bitstream) and made available to the loop filter unit (256) as symbols (221) from the parser (220). Video compression can also be responsive to meta-information obtained during the decoding of previous (in decoding order) parts of the coded picture or coded video sequence, as well as responsive to previously reconstructed and loop-filtered sample values.

The output of the loop filter unit (256) can be a sample stream that can be output to the render device (212) as well as stored in the reference picture memory (257) for use in future inter-picture prediction.

Certain coded pictures, once fully reconstructed, can be used as reference pictures for future prediction. For example, once a coded picture corresponding to a current picture is fully reconstructed and the coded picture has been identified as a reference picture (by, for example, the parser (220)), the current picture buffer (258) can become a part of the reference picture memory (257), and a fresh current picture buffer can be reallocated before commencing the reconstruction of the following coded picture.

The video decoder (210) may perform decoding operations according to a predetermined video compression technology or a standard, such as ITU-T Rec. H.265. The coded video sequence may conform to a syntax specified by the video compression technology or standard being used, in the sense that the coded video sequence adheres to both the syntax of the video compression technology or standard and the profiles as documented in the video compression technology or standard. Specifically, a profile can select certain tools as the only tools available for use under that profile from all the tools available in the video compression technology or standard. Also necessary for compliance can be that the complexity of the coded video sequence is within bounds as defined by the level of the video compression technology or standard. In some cases, levels restrict the maximum picture size, maximum frame rate, maximum reconstruction sample rate (measured in, for example megasamples per second), maximum reference picture size, and so on. Limits set by levels can, in some cases, be further restricted through Hypothetical Reference Decoder (HRD) specifications and metadata for HRD buffer management signaled in the coded video sequence.

In an embodiment, the receiver (231) may receive additional (redundant) data with the encoded video. The additional data may be included as part of the coded video sequence(s). The additional data may be used by the video decoder (210) to properly decode the data and/or to more accurately reconstruct the original video data. Additional data can be in the form of, for example, temporal, spatial, or signal noise ratio (SNR) enhancement layers, redundant slices, redundant pictures, forward error correction codes, and so on.

Figure 3:
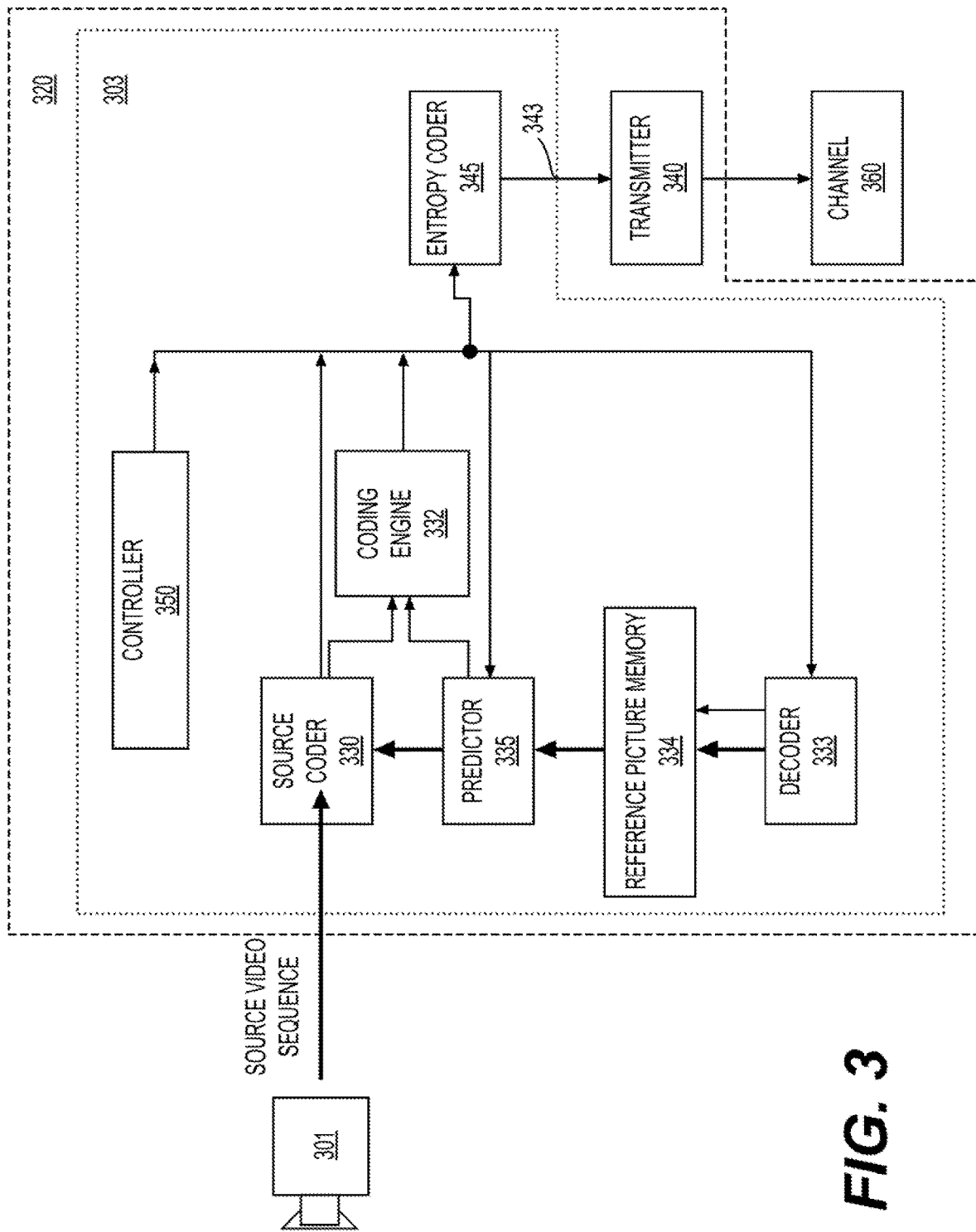
FIG. 3 is a schematic illustration of an exemplary block diagram of an encoder.

FIG. 3 shows an exemplary block diagram of a video encoder (303). The video encoder (303) is included in an electronic device (320). The electronic device (320) includes a transmitter (340) (e.g., transmitting circuitry). The video encoder (303) can be used in the place of the video encoder (103) in the FIG. 1 example.

The video encoder (303) may receive video samples from a video source (301) (that is not part of the electronic device (320) in the FIG. 3 example) that may capture video image(s) to be coded by the video encoder (303). In another example, the video source (301) is a part of the electronic device (320).

The video source (301) may provide the source video sequence to be coded by the video encoder (303) in the form of a digital video sample stream that can be of any suitable bit depth (for example: 8 bit, 10 bit, 12 bit, . . . ), any colorspace (for example, BT.601 Y CrCB, RGB, . . . ), and any suitable sampling structure (for example Y CrCb 4:2:0, Y CrCb 4:4:4). In a media serving system, the video source (301) may be a storage device storing previously prepared video. In a videoconferencing system, the video source (301) may be a camera that captures local image information as a video sequence. Video data may be provided as a plurality of individual pictures that impart motion when viewed in sequence. The pictures themselves may be organized as a spatial array of pixels, wherein each pixel can comprise one or more samples depending on the sampling structure, color space, etc. in use. A person skilled in the art can readily understand the relationship between pixels and samples. The description below focuses on samples.

According to an embodiment, the video encoder (303) may code and compress the pictures of the source video sequence into a coded video sequence (343) in real time or under any other time constraints as required. Enforcing appropriate coding speed is one function of a controller (350). In some embodiments, the controller (350) controls other functional units as described below and is functionally coupled to the other functional units. The coupling is not depicted for clarity. Parameters set by the controller (350) can include rate control related parameters (picture skip, quantizer, lambda value of rate-distortion optimization techniques, . . . ), picture size, group of pictures (GOP) layout, maximum motion vector search range, and so forth. The controller (350) can be configured to have other suitable functions that pertain to the video encoder (303) optimized for a certain system design.

In some embodiments, the video encoder (303) is configured to operate in a coding loop. As an oversimplified description, in an example, the coding loop can include a source coder (330) (e.g., responsible for creating symbols, such as a symbol stream, based on an input picture to be coded, and a reference picture(s)), and a (local) decoder (333) embedded in the video encoder (303). The decoder (333) reconstructs the symbols to create the sample data in a similar manner as a (remote) decoder also would create. The reconstructed sample stream (sample data) is input to the reference picture memory (334). As the decoding of a symbol stream leads to bit-exact results independent of decoder location (local or remote), the content in the reference picture memory (334) is also bit exact between the local encoder and remote encoder. In other words, the prediction part of an encoder "sees" as reference picture samples exactly the same sample values as a decoder would "see" when using prediction during decoding. This fundamental principle of reference picture synchronicity (and resulting drift, if synchronicity cannot be maintained, for example because of channel errors) is used in some related arts as well.

The operation of the "local" decoder (333) can be the same as of a "remote" decoder, such as the video decoder (210), which has already been described in detail above in conjunction with FIG. 2. Briefly referring also to FIG. 2, however, as symbols are available and encoding/decoding of symbols to a coded video sequence by an entropy coder (345) and the parser (220) can be lossless, the entropy decoding parts of the video decoder (210), including the buffer memory (215), and parser (220) may not be fully implemented in the local decoder (333).

In an embodiment, a decoder technology except the parsing/entropy decoding that is present in a decoder is present, in an identical or a substantially identical functional form, in a corresponding encoder. Accordingly, the disclosed subject matter focuses on decoder operation. The description of encoder technologies can be abbreviated as they are the inverse of the comprehensively described decoder technologies. In certain areas a more detail description is provided below.

During operation, in some examples, the source coder (330) may perform motion compensated predictive coding, which codes an input picture predictively with reference to one or more previously coded picture from the video sequence that were designated as "reference pictures." In this manner, the coding engine (332) codes differences between pixel blocks of an input picture and pixel blocks of reference picture(s) that may be selected as prediction reference(s) to the input picture.

The local video decoder (333) may decode coded video data of pictures that may be designated as reference pictures, based on symbols created by the source coder (330). Operations of the coding engine (332) may advantageously be lossy processes. When the coded video data may be decoded at a video decoder (not shown in FIG. 3), the reconstructed video sequence typically may be a replica of the source video sequence with some errors. The local video decoder (333) replicates decoding processes that may be performed by the video decoder on reference pictures and may cause reconstructed reference pictures to be stored in the reference picture memory (334). In this manner, the video encoder (303) may store copies of reconstructed reference pictures locally that have common content as the reconstructed reference pictures that will be obtained by a far-end video decoder (absent transmission errors).

The predictor (335) may perform prediction searches for the coding engine (332). That is, for a new picture to be coded, the predictor (335) may search the reference picture memory (334) for sample data (as candidate reference pixel blocks) or certain metadata such as reference picture motion vectors, block shapes, and so on, that may serve as an appropriate prediction reference for the new pictures. The predictor (335) may operate on a sample block-by-pixel block basis to find appropriate prediction references. In some cases, as determined by search results obtained by the predictor (335), an input picture may have prediction references drawn from multiple reference pictures stored in the reference picture memory (334).

The controller (350) may manage coding operations of the source coder (330), including, for example, setting of parameters and subgroup parameters used for encoding the video data.

Output of all aforementioned functional units may be subjected to entropy coding in the entropy coder (345). The entropy coder (345) translates the symbols as generated by the various functional units into a coded video sequence, by applying lossless compression to the symbols according to technologies such as Huffman coding, variable length coding, arithmetic coding, and so forth.

The transmitter (340) may buffer the coded video sequence(s) as created by the entropy coder (345) to prepare for transmission via a communication channel (360), which may be a hardware/software link to a storage device which would store the encoded video data. The transmitter (340) may merge coded video data from the video encoder (303) with other data to be transmitted, for example, coded audio data and/or ancillary data streams (sources not shown).

The controller (350) may manage operation of the video encoder (303). During coding, the controller (350) may assign to each coded picture a certain coded picture type, which may affect the coding techniques that may be applied to the respective picture. For example, pictures often may be assigned as one of the following picture types:

An Intra Picture (I picture) may be one that may be coded and decoded without using any other picture in the sequence as a source of prediction. Some video codecs allow for different types of intra pictures, including, for example Independent Decoder Refresh ("IDR") Pictures. A person skilled in the art is aware of those variants of I pictures and their respective applications and features.

A predictive picture (P picture) may be one that may be coded and decoded using intra prediction or inter prediction using at most one motion vector and reference index to predict the sample values of each block.

A bi-directionally predictive picture (B Picture) may be one that may be coded and decoded using intra prediction or inter prediction using at most two motion vectors and reference indices to predict the sample values of each block. Similarly, multiple-predictive pictures can use more than two reference pictures and associated metadata for the reconstruction of a single block.

Source pictures commonly may be subdivided spatially into a plurality of sample blocks (for example, blocks of 4×4, 8×8, 4×8, or 16×16 samples each) and coded on a block-by-block basis. Blocks may be coded predictively with reference to other (already coded) blocks as determined by the coding assignment applied to the blocks' respective pictures. For example, blocks of I pictures may be coded non-predictively or they may be coded predictively with reference to already coded blocks of the same picture (spatial prediction or intra prediction). Pixel blocks of P pictures may be coded predictively, via spatial prediction or via temporal prediction with reference to one previously coded reference picture. Blocks of B pictures may be coded predictively, via spatial prediction or via temporal prediction with reference to one or two previously coded reference pictures.

The video encoder (303) may perform coding operations according to a predetermined video coding technology or standard, such as ITU-T Rec. H.265. In its operation, the video encoder (303) may perform various compression operations, including predictive coding operations that exploit temporal and spatial redundancies in the input video sequence. The coded video data, therefore, may conform to a syntax specified by the video coding technology or standard being used.

In an embodiment, the transmitter (340) may transmit additional data with the encoded video. The source coder (330) may include such data as part of the coded video sequence. Additional data may comprise temporal/spatial/ SNR enhancement layers, other forms of redundant data such as redundant pictures and slices, SEI messages, VUI parameter set fragments, and so on.

A video may be captured as a plurality of source pictures (video pictures) in a temporal sequence. Intra-picture prediction (often abbreviated to intra prediction) makes use of spatial correlation in a given picture, and inter-picture prediction makes uses of the (temporal or other) correlation between the pictures. In an example, a specific picture under encoding/decoding, which is referred to as a current picture, is partitioned into blocks. When a block in the current picture is similar to a reference block in a previously coded and still buffered reference picture in the video, the block in the current picture can be coded by a vector that is referred to as a motion vector. The motion vector points to the reference block in the reference picture, and can have a third dimension identifying the reference picture, in case multiple reference pictures are in use.

In some embodiments, a bi-prediction technique can be used in the inter-picture prediction. According to the bi-prediction technique, two reference pictures, such as a first reference picture and a second reference picture that are both prior in decoding order to the current picture in the video (but may be in the past and future, respectively, in display order) are used. A block in the current picture can be coded by a first motion vector that points to a first reference block in the first reference picture, and a second motion vector that points to a second reference block in the second reference picture. The block can be predicted by a combination of the first reference block and the second reference block.

Further, a merge mode technique can be used in the inter-picture prediction to improve coding efficiency.

According to some embodiments of the disclosure, predictions, such as inter-picture predictions and intra-picture predictions, are performed in the unit of blocks. For example, according to the HEVC standard, a picture in a sequence of video pictures is partitioned into coding tree units (CTU) for compression, the CTUs in a picture have the same size, such as 64×64 pixels, 32×32 pixels, or 16×16 pixels. In general, a CTU includes three coding tree blocks (CTBs), which are one luma CTB and two chroma CTBs. Each CTU can be recursively quadtree split into one or multiple coding units (CUs). For example, a CTU of 64×64 pixels can be split into one CU of 64×64 pixels, or 4 CUs of 32×32 pixels, or 16 CUs of 16×16 pixels. In an example, each CU is analyzed to determine a prediction type for the CU, such as an inter prediction type or an intra prediction type. The CU is split into one or more prediction units (PUs) depending on the temporal and/or spatial predictability. Generally, each PU includes a luma prediction block (PB), and two chroma PBs. In an embodiment, a prediction operation in coding (encoding/decoding) is performed in the unit of a prediction block. Using a luma prediction block as an example of a prediction block, the prediction block includes a matrix of values (e.g., luma values) for pixels, such as 8×8 pixels, 16×16 pixels, 8×16 pixels, 16×8 pixels, and the like.

It is noted that the video encoders (103) and (303), and the video decoders (110) and (210) can be implemented using any suitable technique. In an embodiment, the video encoders (103) and (303) and the video decoders (110) and (210) can be implemented using one or more integrated circuits. In another embodiment, the video encoders (103) and (303), and the video decoders (110) and (210) can be implemented using one or more processors that execute software instructions.

Various inter prediction modes can be used in VVC. For an inter-predicted CU, motion parameters can include MV(s), one or more reference picture indices, a reference picture list usage index, and additional information for certain coding features to be used for inter-predicted sample generation. A motion parameter can be signaled explicitly or implicitly. When a CU is coded with a skip mode, the CU can be associated with a PU and can have no significant residual coefficients, no coded motion vector delta or MV difference (e.g., MVD) or a reference picture index. A merge mode can be specified where the motion parameters for the current CU are obtained from neighboring CU(s), including spatial and/or temporal candidates, and optionally additional information such as introduced in VVC. The merge mode can be applied to an inter-predicted CU, not only for skip mode. In an example, an alternative to the merge mode is the explicit transmission of motion parameters, where MV(s), a corresponding reference picture index for each reference picture list and a reference picture list usage flag and other information are signaled explicitly per CU.

In an embodiment (e.g., in VVC), VVC Test model (VTM) reference software includes one or more refined inter prediction coding tools that include: an extended merge prediction, a merge motion vector difference (MMVD) mode, an adaptive motion vector prediction (AMVP) mode with symmetric MVD signaling, an affine motion compensated prediction, a subblock-based temporal motion vector prediction (SbTMVP), and the like. Inter predictions and related methods are described in details below.

Extended merge prediction can be used in some examples. In an example, such as in VTM4 or ECM, a merge candidate list can be constructed by including one or more types of candidates (or candidate types), for example, in an order of: spatial motion vector predictor(s) (MVP(s)) (SMVP(s)) from spatial neighboring CU(s), temporal MVP(s) (TMVP(s)) from collocated CU(s), non-adjacent MVP(s) (NA-MVP(s)) from spatially non-adjacent CU(s), history-based MVP(s) (HMVP(s)) from a first-in-first-out (FIFO) table, pairwise average MVP(s) (PAMVP(s)), and zero MV(s). The merge candidate list can be used in a merge mode, such as a regular merge mode, a template matching (TM) merge mode, a bilateral matching (BM) merge mode, a subblock-based merge mode, an affine merge mode, and/or the like.

In an embodiment, spatial candidate(s) are derived as follows. The derivation of spatial merge candidates in VVC can be identical to that in HEVC. In an example, a maximum of four merge candidates are selected among candidates located in positions depicted in FIG. 4A. FIG. 4A shows exemplary positions of spatial merge candidates. An exemplary order of derivation can be B1, A1, B0, A0, and B2. The position B2 is considered only when any CU of positions A0, B0, B1, and A1 is not available (e.g. the CU belongs to another slice or another tile) or is intra coded. After a candidate at the position A1 is added, the addition of the remaining candidates can be subject to a redundancy check which ensures that candidates with same motion information are excluded from the candidate list so that coding efficiency is improved.

FIG. 4B shows exemplary candidate positions (e.g., C0 and C1) for a temporal merge candidate of a current CU. A position for the temporal merge candidate can be selected between the candidate positions C0 and C1. The candidate position C0 is located at a bottom-right corner of a co-located CU (410) of the current CU. The candidate position C1 is located at a center of the co-located CU (410). If a CU at the candidate position C0 is not available, is intra coded, or is outside of a current row of CTUs, the candidate position C1 can be used to derive the temporal merge candidate.

Otherwise, the candidate position C0 can be used to derive the temporal merge candidate.

FIG. 4C shows an exemplary pattern of spatial merge candidates of a current coding block (420). The spatial merge candidates can include adjacent SMVPs (e.g., 1-5) and NA-MVPs (e.g., 6-23) from spatially non-adjacent CU(s). The NA-MVPs can be referred to as non-adjacent spatial merge candidates. Distances between the non-adjacent spatial merge candidates (e.g., 6-23) and the current coding block (420) can be based on a width and a height of the current coding block (420). One of more of the non-adjacent spatial merge candidate(s) (e.g., 6-23) can be inserted after a TMVP in a merge candidate list (e.g., a regular merge candidate list).

A template matching (TM) technique can be used in video/image coding. The TM can be used at a decoder side. TM can be used to refine an MV. TM can be cascaded (e.g., used together) with other coding method(s), such as a bilateral matching process, reordering merge candidates in a merge candidate list, and the like.

Figure 5A:
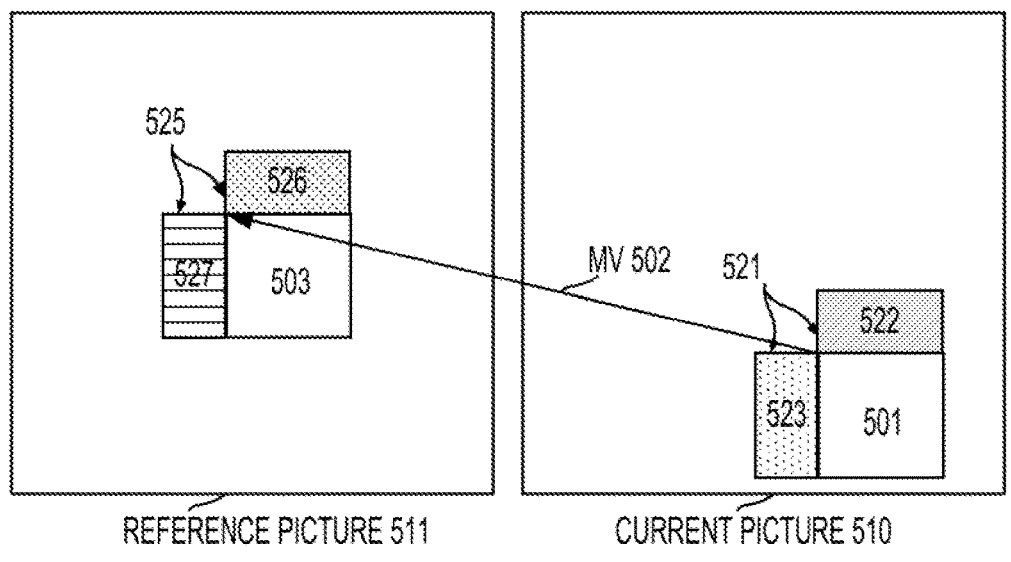
FIGS. 5A-5B show exemplary templates in template matching that is used in reordering merge candidates in a merge candidate list.
Figure 5B:
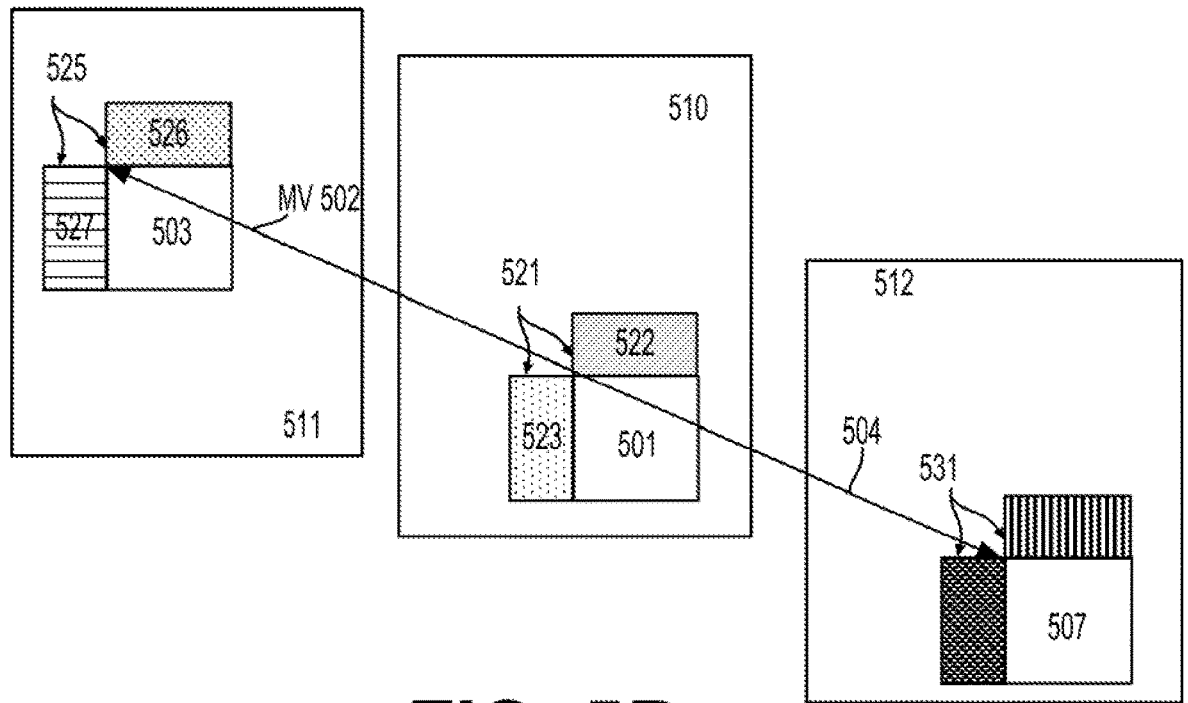

FIGS. 5A-5B show exemplary templates in TM that is used in reordering merge candidates in a merge candidate list. In FIG. 5A, a current template (521) of a current block (501) in a current picture (510) can have any suitable shape and any suitable size. In an embodiment, the current template (521) of the current block (501) includes a top template (522) and a left template (523). Each of the top template (522) and the left template (523) can have any suitable shape and any suitable size. The top template (522) can include samples in one or more top neighboring blocks of the current block (501). In an example, the top template (522) includes N1 (e.g., 1 or 4) rows of samples in one or more top neighboring blocks of the current block (501). The left template (523) can include samples in one or more left neighboring blocks of the current block (501). In an example, the left template (523) includes N2 (e.g., 1 or 4) columns of samples in the one or more left neighboring blocks of the current block (501).

In an embodiment, the merge candidates in the merge candidate list include a merge candidate having an MV (502) pointing from the current block (501) to a reference block (503) in a reference picture (511). A shape and a size of a reference template can match the shape and the size of the current template (521), respectively. In FIG. 5A, a reference template (525) of the reference block (503) in the reference picture (511) can have an identical shape and an identical size as those of the current template (521) in the current picture (510). For example, the reference template (525) of the reference block (503) includes a top template (526) in the reference picture (511) and a left template (527) in the reference picture (511). The top template (526) can include samples in one or more top neighboring blocks of the reference block (503). The left template (527) can include samples in one or more left neighboring blocks of the reference block (503).

A TM cost corresponding to the merge candidate having the MV (502) can be determined based on a pair of templates, such as the current template (521) and the reference template (525). In an example, the TM cost is determined based on a sum of absolute difference (SAD) between the current template (521) and the reference template (525). Other functions, such as sum of squared errors (SSE), a variance, a partial SAD, or the like can also be used to determine the TM cost. The TM cost can indicate matching between the current template (521) and the reference template (525).

The TM can be used to reorder the merge candidates in the merge candidate list as described below. In an example, the merge candidates include first merge candidates to be reordered. For each of the first merge candidates to be reordered, a respective reference template can be determined based on a respective MV of the first merge candidate and a respective TM cost can be determined based on the current template and the respective reference template as described in FIG. 5A. Subsequently, the first merge candidates can be ranked (e.g., reordered) based on the TM costs, for example, in an ascending order of the TM costs.

When a merge candidate includes two MVs (e.g., used in bi-prediction) pointing to reference templates in two reference pictures, a TM cost can be determined as shown in FIG. 5B.

FIG. 5B shows an exemplary merge candidate in the merge candidate list that includes two MVs (e.g., used in bi-prediction), such as the MV (502) as described in FIG. 5A and an MV (504) pointing to a reference block (507) in a reference picture (512). A reference template (531) is associated with the reference block (507) in the reference picture (512). The reference template (531) can have an identical shape and an identical size as those of the current template (521). A TM cost can be determined based on the current template (521) and the reference templates (525) and (531). In an example, a predictor template of the merge candidate is determined based on the reference templates (525) and (531), for example, the predictor template is an average (e.g., a weighted average) of the reference templates (525) and (531). The TM cost can be determined based on the current template (521) and the predictor template.

Figure 6:
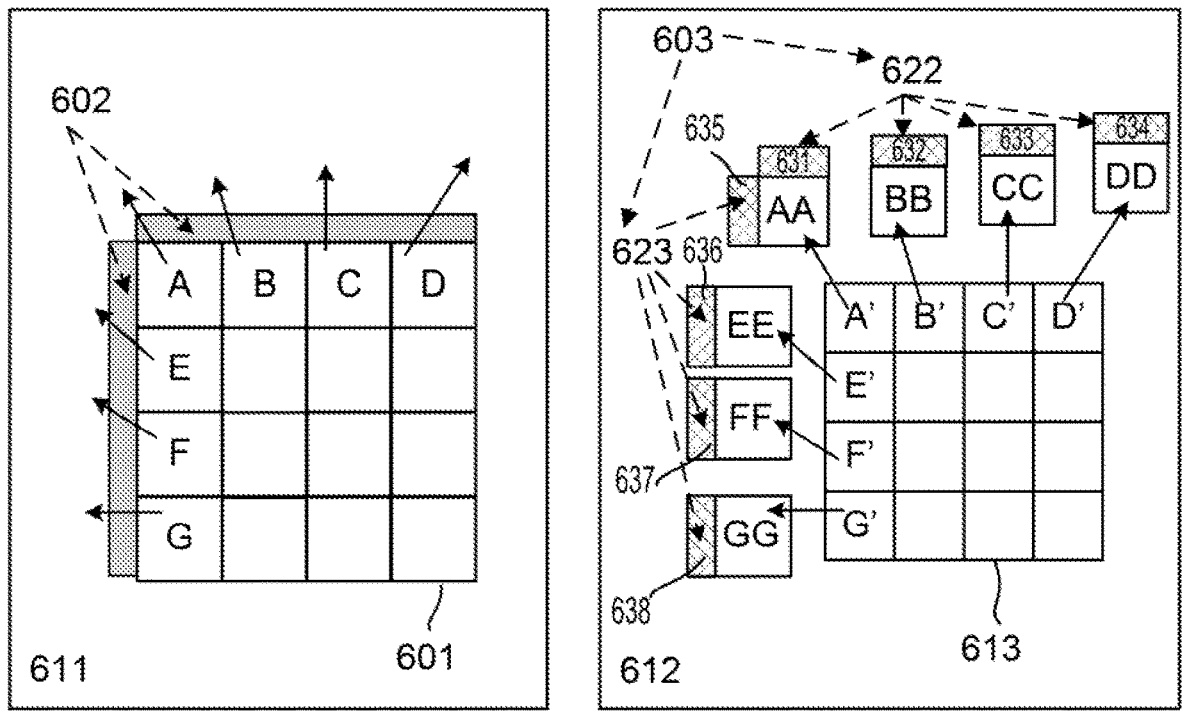
FIG. 6 shows a current template of a current block in a current picture and a reference template in a reference picture that is determined based on subblock-based motion information of the current block according to an embodiment of the disclosure.

When a merge candidate is a subblock-based merge candidate, a reference template can be determined as shown in FIG. 6. FIG. 6 shows a current template (602) of a current block (601) in a current picture (611) and a reference template (603) in a reference picture (612) that corresponds to the current template (602) according to an embodiment of the disclosure. The current block (601) has subblock-based motion information, and the reference template (603) can be determined based on motion information that is indicated by arrows associated with respective subblocks A-G of the current block (601). The motion information that is indicated by the arrows associated with the subblocks A-G in the first row and the first column of current block (601) can be used to derive sub-templates (or reference subblock templates) (631-638) in the reference template (603).

The motion information (indicated by the arrows associated with A-G) of the respective subblocks A-G in the current block (601) can point to reference subblocks AA-GG in the reference picture (612). The reference template (603) can include the multiple reference subblock templates (631)-(638) that are associated with the reference subblocks AA-GG. For example, the reference subblock templates (631)-(634) are above the reference subblocks AA-DD, and the reference subblock templates (635)-(638) are to the left of the reference subblocks AA and EE-GG. The reference template (603) can include an above reference template (622) and a left reference template (623). The above reference template (622) can include the reference subblock templates (631)-(634). The left reference template (623) can include the reference subblock templates (635)-(638). For a subblock-based merge candidate with a subblock size equal to Wsub×Hsub, an above template (e.g., the above reference template (622)) can include multiple sub-templates with a size of Wsub×M1, and a left template (e.g., the left reference template (623)) can include multiple sub-templates with the size of M2×Hsub. In an example, M1 is 1. In an example, M2 is 1.

In an example, the reference subblocks AA-GG can be determined as below. A collocated block (613) in the reference picture (612) can be determined based on the current block (601). Collocated subblocks A'-G' in the collocated block (613) can correspond to the subblocks A-G, respectively, as shown in FIG. 6. The reference subblocks AA-GG can be determined based on the collocated subblocks A'-G' and the motion information (indicated by arrows associated with A'-G') of the respective subblocks A-G in the current block (601).

Adaptive reordering of merge candidates (ARMC) with template matching can be used to reorder merge candidates for a candidate list (e.g., a merge candidate list) based on TM costs as described above in FIGS. 5A, 5B, and/or 6. In the ARMC, the merge candidates in the merge candidate list can be reordered using template matching based at least on a template matching cost associated with each merge candidate. The candidate list can include any suitable type of candidates, such as a TMVP type, an NA-SMVP type, and/or the like. The candidate list can be reordered by using the TM costs, for example, in an ascending order. The reordering method can be applied to any suitable merge mode, such as the regular merge mode, the TM merge mode, the affine merge mode, or the like. In the affine merge mode, a subblock-based TMVP (SbTMVP) candidate may or may not be included. In an example, the merge candidates are reordered before the refinement process for the TM merge mode.

In some examples, after a merge candidate list is constructed, merge candidates can be divided into one or more subgroups. In an example, the merge candidates are divided into subgroup(s) based on candidate types, for example, TMVP(s) are in a same subgroup, SMVP(s) are in another subgroup. The subgroup size can be set to a value (e.g., 5). Merge candidates in each subgroup can be reordered, for example, ascendingly according to TM costs of the merge candidates in the respective subgroup based on the TM described in the disclosure. For simplification, in an example, merge candidates in the last subgroup are not reordered if the last subgroup is not the first subgroup.

To improve the coding efficiency, the merge candidates reordering can be applied to merge candidates regardless of the candidate types. In an example, the merge candidates include hybrid candidate types such as a NA-MVP type, an HMVP type, a PAMVP type, and/or the like. In some embodiments, the merge candidate list may include duplicate zero MV candidates (e.g., multiple duplicate zero MV candidates). The motion vector is (0, 0) for all available reference list(s) (e.g., (i) a first reference list 0 (L0), (ii) a second reference list 1 (L1), and (iii) the first reference list 0 and the second reference list 1) and may be sorted such that the zero MV candidate(s) can be put at an early position.

In some examples, zero MV candidates (e.g., all zero MV candidates) are excluded from the ARMC reordering process, such as shown in FIG. 7A. In FIG. 7A, the merge candidate list includes 10 merge candidates denoted by Cand0-Cand9, respectively. An order of the 10 merge candidates is from Cand0 to Cand9 with Cand0 and Cand9 being the first position and the last position (the end position) in the merge candidate list, respectively. For example, Cand0 and Cand1 are SMVPs (e.g., A1 and B1), Cand2-Cand6 are zero MVs (e.g., Zero1), Cand7 is a TMVP (e.g., Tempo), Cand8 is an NA-MVP (e.g., Non-ADJ3), and Cand9 is a PAMVP (e.g., Pairwise). Referring to FIG. 7A, the zero MV candidates including Cand2-Cand6 are excluded from the ARMC reordering process, and thus only Cand0, Cand1, and Cand7-Cand9 are reordered in the ARMC reordering process.

After the ARMC reordering process (e.g., performed on merge candidates that are not zero MV candidates), the zero MV candidates (e.g., the duplicated zero MV candidates) can be filled at the end of the merge candidate list (e.g., the reordered merge candidate list), such as shown in FIG. 7B. After the ARMC reordering process, A1, B1, and Tempo remain in the same positions (e.g., the first three positions) in the reordered merge candidate list, the positions of Pairwise and Non-ADJ3 are switched. Thus, new positions in the reordered merge candidate list correspond to 10 new merge candidates (NewCand0-NewCand9) shown in FIG. 7B. FIG. 7B shows that the zero MV candidates are filled at the end of the reordered merge candidate list as NewCand5-NewCand9.

In some examples, excluding all the zero MV candidates from the ARMC reordering process may not be efficient for the following reason. When a zero MV candidate is put toward the end of the merge candidate list, an index indicating the zero MV candidate can be relatively large (e.g., the index being 5 for the NewCand5 in FIG. 7B). Thus, a signal overhead of the zero MV candidate can be large and the coding of the zero MV candidate is not efficient. According to embodiments of the disclosure, a merge candidate having a zero MV can be included in the ARMV process. Whether a zero MV can be added into the merge candidate list for the adaptive reordering of the merge candidate list and how to fill the zero MV in the merge candidate list for the ARMC are described below.

According to an embodiment of the disclosure, when a merge candidate list of a current block in a current picture does not include a merge candidate having zero MV(s), a merge candidate having the zero MV(s) can be added into the merge candidate list for an ARMC process. The ARMC with the TM can be performed such that merge candidates in the merge candidate list that include the merge candidate having the zero MV(s) are reordered. The current block can be reconstructed based on the reordered merge candidates. In an example, a merge candidate is selected from the reordered merge candidates or the reordered merge candidate list that includes the merge candidate having the zero MV(s) and the current block is reconstructed based on the selected merge candidate.

The ARMC can be performed on the merge candidates including the merge candidate having the zero MV(s). TM costs corresponding to the respective merge candidates that include the merge candidate having the zero MV(s) can be determined, such as described in FIGS. 5A, 5B, and 6. Each TM cost can be determined based on a current template of the current block and a predictor template of the respective merge candidate. The predictor template can be based at least on a reference template in a reference picture corresponding to respective merge candidate.

In an example, the merge candidate is for uni-prediction, and includes an MV (e.g., the MV 502). The predictor template can be the reference template (e.g., (525)) in the reference picture (e.g., (511)). If the merge candidate is a subblock-based merge candidate for uni-prediction, referring to FIG. 6, the predictor template can be the reference template (e.g., (603)) that includes multiple reference subblock templates (e.g., (631)-(638)).

In an example, the merge candidate is for bi-prediction, and includes the MV (e.g., the MV (502)) and another MV (e.g., (504)). The predictor template can be determined based on the reference template (e.g., (525)) in the reference picture (e.g., (511)) and another reference template associated with the other MV (e.g., (504)), such as described in FIG. 5B.

If the merge candidate is a subblock-based merge candidate for bi-prediction, referring to FIGS. 5B and 6, the predictor template can be determined based on the reference template (e.g., (603)) and another reference template (e.g., including multiple reference subblock templates).

After determining the TM costs for the merge candidates, the merge candidates that include the merge candidate having the zero MV can be reordered or ranked based on the determined TM costs, for example, in an ascending order of the determined TM costs.

In an example, at least one zero MV can be filled (or added) into the merge candidate list for the ARMC process when an MV of available merge candidates (e.g., all available merge candidates) in the merge candidate list including, for example, SMVP(s), TMVP(s), NA-MVP(s), HMVP(s), and/or PAMVP(s) is not zero (e.g., (0, 0)). The zero MV can be an MV for available reference list(s) (e.g., all available reference list(s)) and a reference index for each reference list is to be valid. For example, if an available merge candidate has a (0, 0) MV for all available reference list(s), an MV of the available merge candidate in the merge candidate list is zero (e.g., (0, 0)), the merge candidate list is determined to have a merge candidate with a zero MV. Thus, no zero MV filling into the merge candidate list is required, and a zero MV is not added to the merge candidate list.

In an example, the merge candidate having a zero MV or (0, 0) MV for available reference list(s) (e.g., all available reference list(s)) refers to (i) the merge candidate has a zero MV associated with the first reference picture list 0 (L0) and an invalid reference index associated with the second reference picture list 1 (L1), (ii) the merge candidate has a zero MV associated with L1 and an invalid reference index associated with L0, or (iii) the merge candidate has a zero MV associated with L0 and L1. For example, for a uni-prediction merge candidate, all the available reference list(s) can be L0 or L1, and the uni-prediction merge candidate can have a zero MV associated with L0 or L1. For a bi-prediction merge candidate, all the available reference list(s) can include L0 and L1, and the bi-prediction merge candidate can have a zero MV associated with L0 and a zero MV associated with L1.

Figure 8:
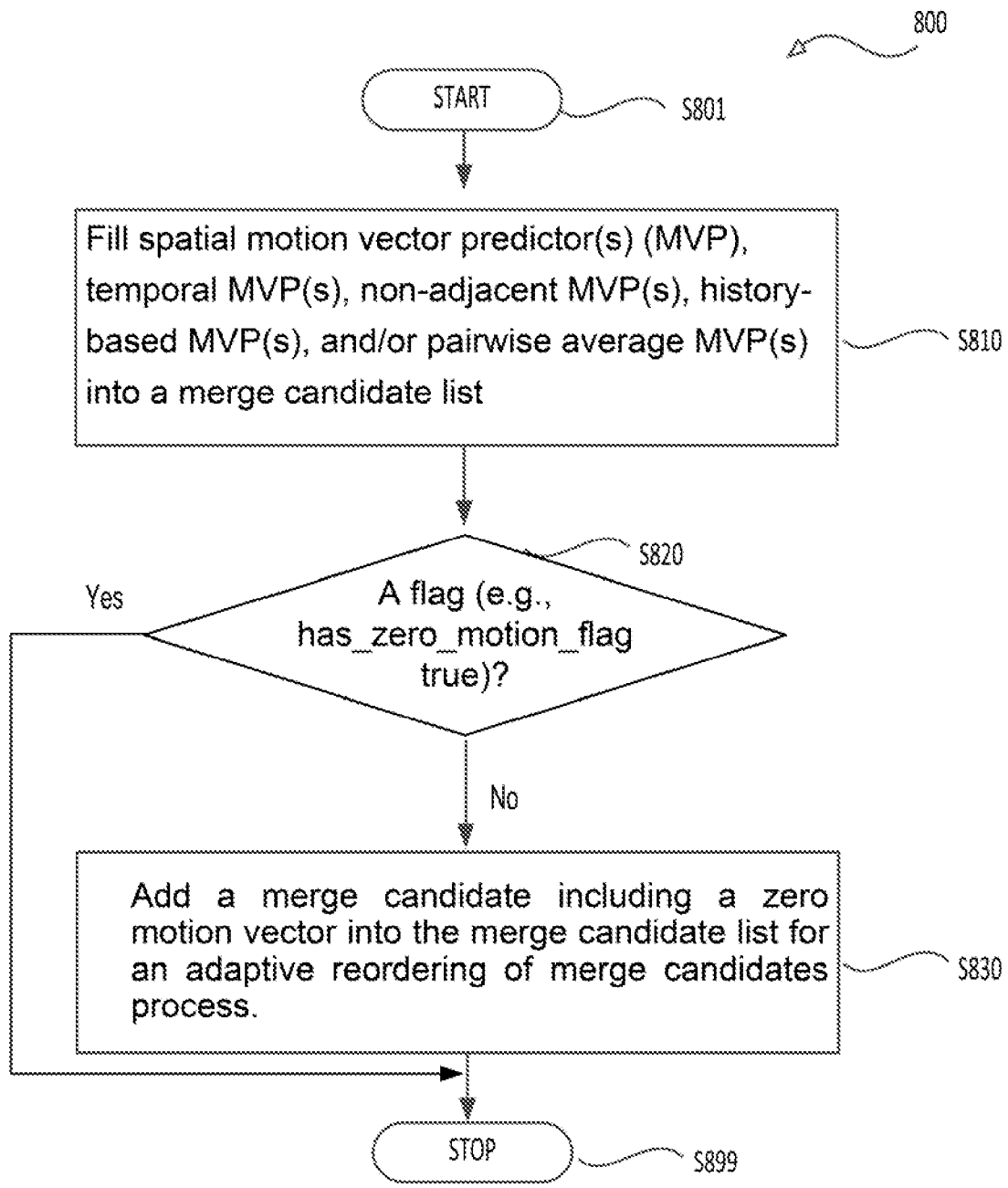
FIG. 8 shows a flowchart of a zero motion vector filling process in an ARMC process according to an embodiment of the disclosure.

FIG. 8 shows a flowchart of a zero MV filling process (800) in an ARMC process. The process starts at (S801) and proceeds to (S810).

At (S810), merge candidates including one or more of SMVP(s), TMVP(s), NA-MVP(s), HMVP(s), PAMVP(s), and the like can be added (filled) into a merge candidate list. In an example, available SMVP(s), TMVP(s), NA-MVP(s), HMVP(s), and PAMVP(s) are checked and filled into the merge candidate list.

At (S820), whether a flag (e.g., has_zero_motion_flag) is true is determined. The flag is true if an MV of one of the merge candidates satisfies one of three conditions (i)-(iii) described below.

The condition (i) can include that the MV associated with a reference picture in L0 is a zero MV (e.g., (0, 0)). Under the condition (i), a reference index associated with L0 is valid and a reference index associated with L1 is invalid (e.g., the reference index associated with L1 is not larger than and not equal to 0, or the reference index associated with L1 is less than 0).

The condition (ii) can include that the MV associated with a reference picture in L1 is a zero MV (e.g., (0, 0)). Under the condition (ii), a reference index associated with L1 is valid and a reference index associated with L0 is invalid (e.g., the reference index associated with L0 is not larger than and not equal to 0, or the reference index associated with L0 is less than 0).

The condition (iii) can include that the MV associated with a reference picture in L0 is a zero MV (e.g., (0, 0)) and the MV associated with a reference picture in L1 is a zero MV (e.g., (0, 0)).

In an example, the one of the merge candidates satisfying the condition (i) or the condition (ii) is for uni-prediction, and includes a zero MV pointing to a reference picture in L0 or a reference picture in L1.

In an example, the one of the merge candidates satisfying the condition (iii) is for bi-prediction, and includes a zero MV pointing to a reference picture in L0 and a zero MV pointing to a reference picture in L1.

When the flag (e.g., the has_zero_motion_flag) is true, the merge candidate list construction for the ARMC process is finished. The zero MV filling process (800) proceeds to (S899), and terminates. Otherwise, if the flag (e.g., the has_zero_motion_flag) is not true, the zero MV filling process (800) proceeds to (S830).

At (S830), a merge candidate including a zero MV can be added into the merge candidate list for the ARMC process. For example, the zero MV is added (e.g., filled) into the merge candidate list for the ARMC process. One or more reference indices of the added merge candidate including the zero MV can be determined as below.

In an embodiment, at least one reference index of the added merge candidate having the zero MV is 0. In an example, a reference index of the filled zero MV for available reference picture list(s) in the ARMC process is 0. The available reference picture list(s) can include (i) L0 or L1 for uni-prediction or (ii) L0 and L1 for bi-prediction. In an example, for bi-prediction, a first reference index of the filled zero MV for L0 is 0 and a second reference index of the filled zero MV for L1 is 0.

In an embodiment, the reference index of the added merge candidate having the zero MV can be a reference index of a reference picture in a reference picture list. An absolute value of a picture order count (POC) difference between the reference picture and the current picture is the smallest among POC differences between the current picture and reference pictures of the current picture. For example, the reference index of the filled zero MV represents the closest active reference picture of the current picture for available reference picture list(s) (e.g., L0, L1, or L0 and L1) where the closest active reference picture is the reference picture having the smallest absolute POC difference with the current picture.

In an embodiment, the reference indices of the zero MV for L0 and L1 are valid for a B-frame.

In an embodiment, the merge candidate also includes another zero MV. A reference index associated with the zero MV indicates a first reference picture in a first reference picture list (e.g., L0), a reference index associated with the other zero MV indicates a second reference picture in a second reference picture list (e.g., L1). The current picture can be a bi-predicted picture, and the first reference picture and the second reference picture are available.

The zero MV filling process (800) then proceeds to (S899), and terminates.

The process (800) can be suitably adapted to various scenarios and steps in the process (800) can be adjusted accordingly. One or more of the steps in the process (800) can be adapted, omitted, repeated, and/or combined. Any suitable order can be used to implement the process (800). Additional step(s) can be added.

According to an embodiment of the disclosure, at least one zero MV can be added (or filled) into the merge candidate list for the ARMC process when MV(s) of available merge candidates (e.g., all available merge candidates) including, for example, SMVP(s), TMVP(s), NA-MVP(s), HMVP(s), and/or PAMVP(s), is not (0, 0) for both L0 and L1. For example, when the condition (iii) is not satisfied, the at least one zero MV is added into the merge candidate list for the ARMC process. In an example, the condition (i) or the condition (ii) is satisfied, the at least one zero MV is added into the merge candidate list for the ARMC process.

In an example, the condition (iii) is satisfied, and the merge candidate list includes a merge candidate that has a zero MV for both L0 and L1. Thus, no zero MV is added into the merge candidate list.

In an example, the ARMC with TM is performed on the merge candidates that include the merge candidate having the zero MV for both L0 and L1. The current block can be reconstructed based on the reordered merge candidates.

In an embodiment, whether the merge candidate list includes a merge candidate having a first zero MV and a second zero MV associated with a first reference picture in a first reference picture list (e.g., L0) and a second reference picture in a second reference picture list (e.g., L1), respectively is determined. If the merge candidate list is determined not to include the merge candidate that has the first zero MV and the second zero MV, the merge candidate having the first zero MV and the second zero MV can be added to the merge candidate list.

Figure 9:
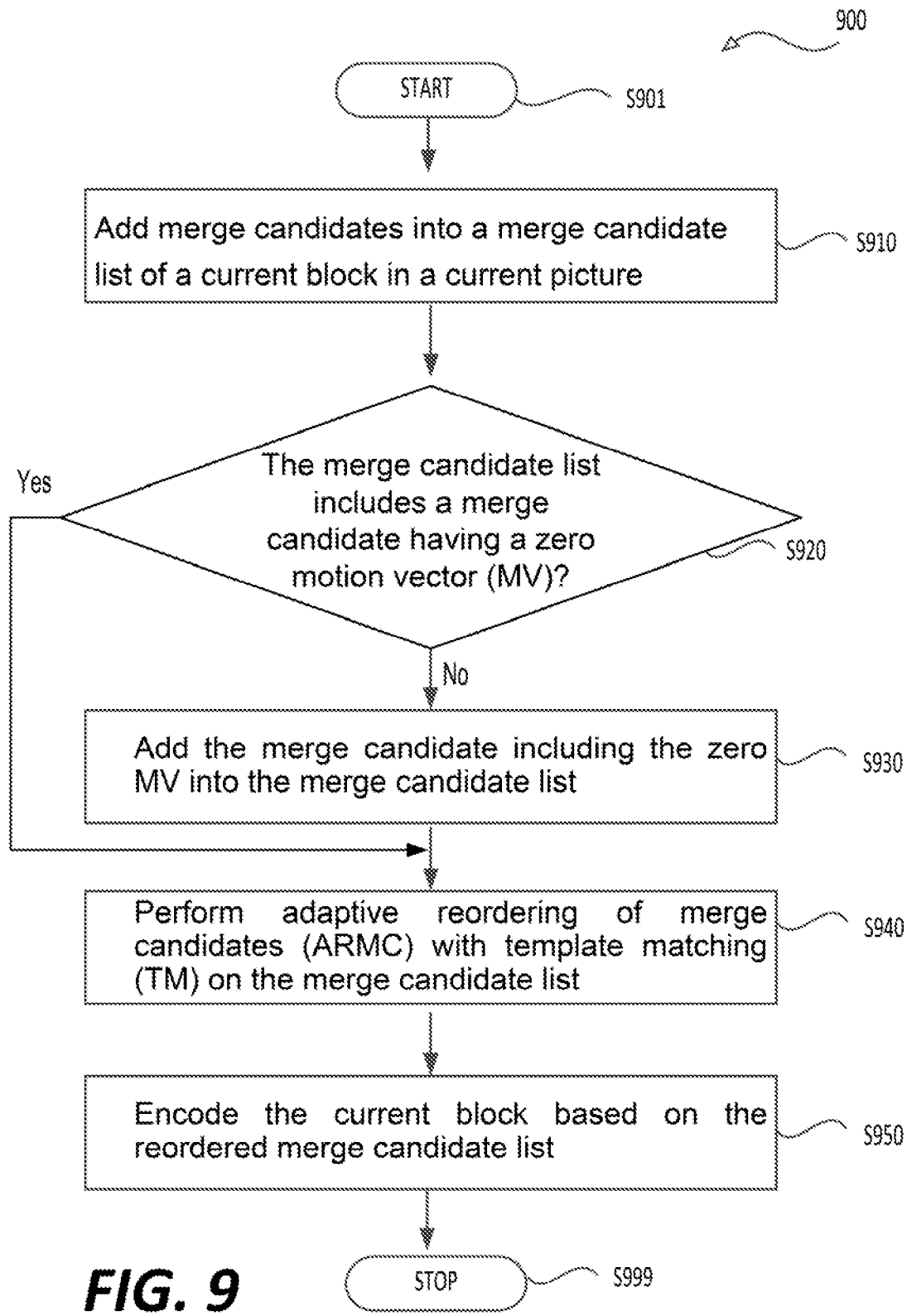
FIG. 9 shows a flow chart outlining an encoding process according to an embodiment of the disclosure.

FIG. 9 shows a flow chart outlining a process (900) according to an embodiment of the disclosure. The process (900) can be used in a video encoder. In various embodiments, the process (900) is executed by processing circuitry, such as the processing circuitry that performs functions of the video encoder (103), the processing circuitry that performs functions of the video encoder (303), and the like. In some embodiments, the process (900) is implemented in software instructions, thus when the processing circuitry executes the software instructions, the processing circuitry performs the process (900). The process starts at (S901) and proceeds to (S910).

At (S910), merge candidates can be added into a merge candidate list of a current block in a current picture. The merge candidates can include available merge candidates including one or more of (i) SMVP(s), (ii) TMVP(s), (iii) NA-MVP(s), (iv) HMVP(s), and (v) PAMVP(s). In an example, a video bitstream comprising a current block in a current picture is received prior to (S910).

At (S920), whether the merge candidate list includes a merge candidate having a zero MV can be determined, such as described at (S820). If the merge candidate list is determined to include the merge candidate having the zero MV, the process (900) proceeds to (S940). Otherwise, if the merge candidate list is determined not to include the merge candidate having the zero MV, the process (900) proceeds to (S930).

In an example, whether (1) the merge candidate list includes all the available merge candidates (e.g., the one or more of the SMVP(s), the TMVP(s), the NA-MVP(s), the HMVP(s), and the PAMVP(s)), and (2) no merge candidate in the merge candidate list has a zero MV are determined. If the merge candidate list includes all the available merge candidates and no merge candidate in the merge candidate list has the zero MV, the process (900) proceeds to (S930). At (S930), the merge candidate having the zero MV can be added to the merge candidate list, such as described at (S830), and the process (900) proceeds to (S940).

At (S940), the adaptive reordering of merge candidates with TM can be performed on the merge candidate list that includes the merge candidate having the zero MV. For example, the merge candidates in the merge candidate list including the merge candidate having the zero MV are reordered using template matching (TM).

At (S950), the current block can be encoded based on the reordered merge candidate list.

The process (900) then proceeds to (S999), and terminates.

The process (900) can be suitably adapted to various scenarios and steps in the process (900) can be adjusted accordingly. One or more of the steps in the process (900) can be adapted, omitted, repeated, and/or combined. Any suitable order can be used to implement the process (900). Additional step(s) can be added.

Figure 10:
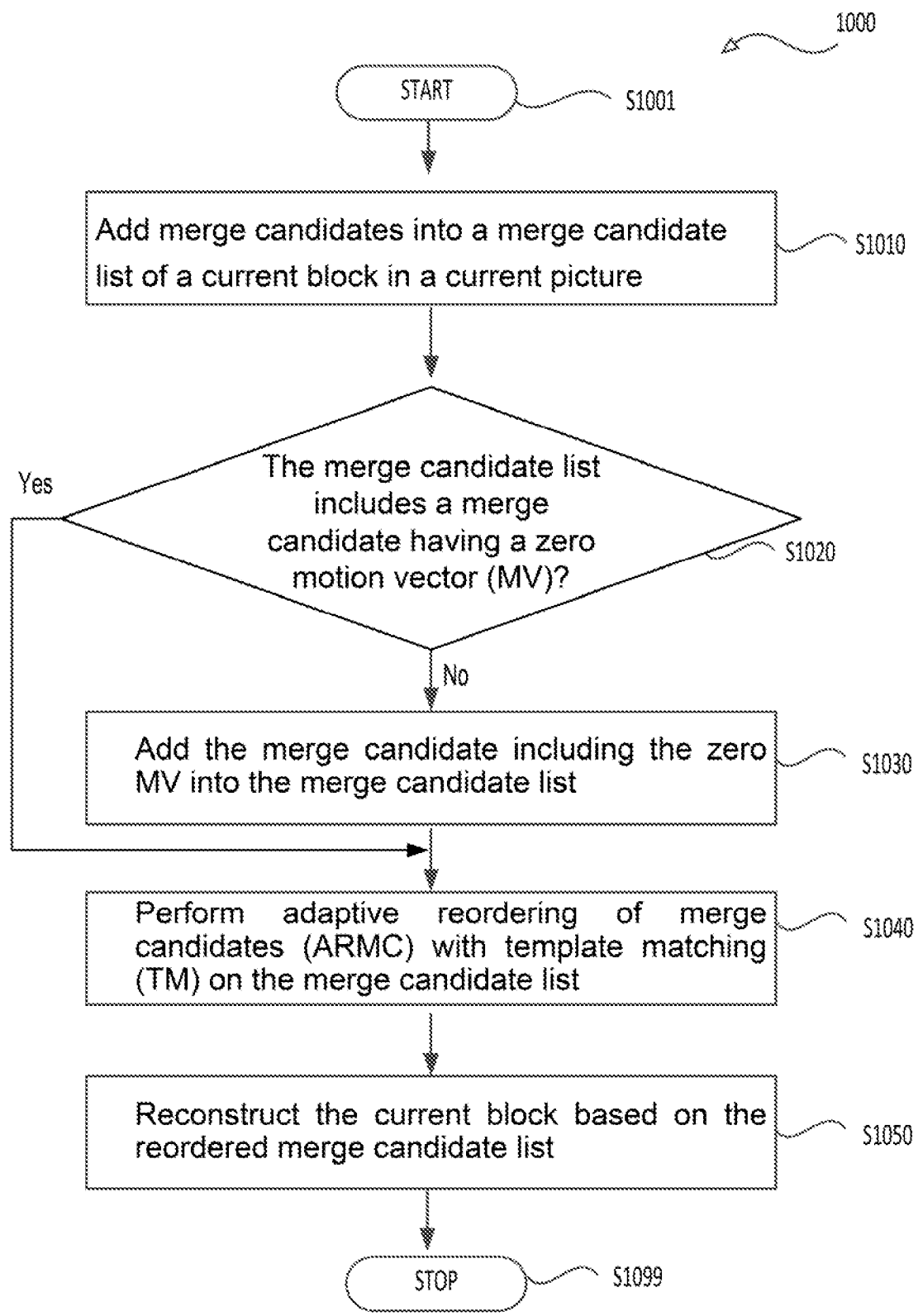
FIG. 10 shows a flow chart outlining a decoding process according to an embodiment of the disclosure.

FIG. 10 shows a flow chart outlining a process (1000) according to an embodiment of the disclosure. The process (1000) can be used in a video decoder. In various embodiments, the process (1000) is executed by processing circuitry, such as the processing circuitry that performs functions of the video decoder (110), the processing circuitry that performs functions of the video decoder (210), and the like. In some embodiments, the process (1000) is implemented in software instructions, thus when the processing circuitry executes the software instructions, the processing circuitry performs the process (1000). The process starts at (S1001) and proceeds to (S1010).

At (S1010), merge candidates can be added into a merge candidate list of a current block in a current picture. The merge candidates can include available merge candidates including one or more of (i) SMVP(s), (ii) TMVP(s), (iii) NA-MVP(s), (iv) HMVP(s), and (v) PAMVP(s).

At (S1020), whether the merge candidate list includes a merge candidate having a zero MV can be determined, such as described at (S820). If the merge candidate list is determined to include the merge candidate having the zero MV, the process (1000) proceeds to (S1040). Otherwise, if the merge candidate list is determined not to include the merge candidate having the zero MV, the process (1000) proceeds to (S1030).

In an embodiment, the merge candidate list is determined to include the merge candidate having the zero MV if one of conditions is satisfied. The conditions can be defined as (a) one of the merge candidates in the merge candidate list is a merge candidate for uni-prediction having a zero MV associated with a reference picture in a first reference picture list or a second reference picture list, and (b) one of the merge candidates in the merge candidate list is a merge candidate for bi-prediction that has (a) the zero MV associated with a reference picture in the first reference picture list and (b) another zero MV associated with a reference picture in the second reference picture list. In an embodiment, the merge candidate list is determined not to include the merge candidate having the zero MV if none of the conditions (a) or (b) above is satisfied.

At (S1030), the merge candidate having the zero MV can be added to the merge candidate list, such as described at (S830), and the process (1000) proceeds to (S1040).

In an example, the merge candidate having the zero MV is added to the merge candidate list where at least one reference index of the added merge candidate has the zero MV being 0.

In an example, the merge candidate having the zero MV is added to the merge candidate list. A reference index of the added merge candidate having the zero MV indicates a reference picture in a reference picture list. An absolute value of a picture order count (POC) difference between the reference picture and the current picture is the smallest among POC differences between the current picture and reference pictures of the current picture.

In an example, the merge candidate having the zero MV and another zero MV is added to the merge candidate list. A reference index associated with the zero MV indicates a first reference picture in a first reference picture list, and a reference index associated with the other zero MV indicates a second reference picture in a second reference picture list. The current picture can be a bi-predicted picture, and the first reference picture and the second reference picture are available.

At (S1040), the ARMC with TM can be performed on the merge candidate list that including the merge candidate having the zero MV.

In an embodiment, TM costs corresponding to each merge candidate in the merge candidate list including the merge candidate having the zero MV are determined. Each TM cost can be determined based on a current template of the current block and a predictor template of the respective merge candidate, such as described in FIGS. 5A, 5B, and 6. The predictor template can be determined based at least on a reference template in a reference picture corresponding to a respective merge candidate. The merge candidates that include the merge candidate having the zero MV can be reordered based on the determined TM costs.

At (S1050), the current block can be reconstructed based on the reordered merge candidate list. In an example, a merge candidate is selected from the reordered merge candidate list that includes the merge candidate having the zero MV and the current block is reconstructed based on the selected merge candidate.

The process (1000) proceeds to (S1099), and terminates.

The process (1000) can be suitably adapted to various scenarios and steps in the process (1000) can be adjusted accordingly. One or more of the steps in the process (1000) can be adapted, omitted, repeated, and/or combined. Any suitable order can be used to implement the process (1000). Additional step(s) can be added.

Figure 11:
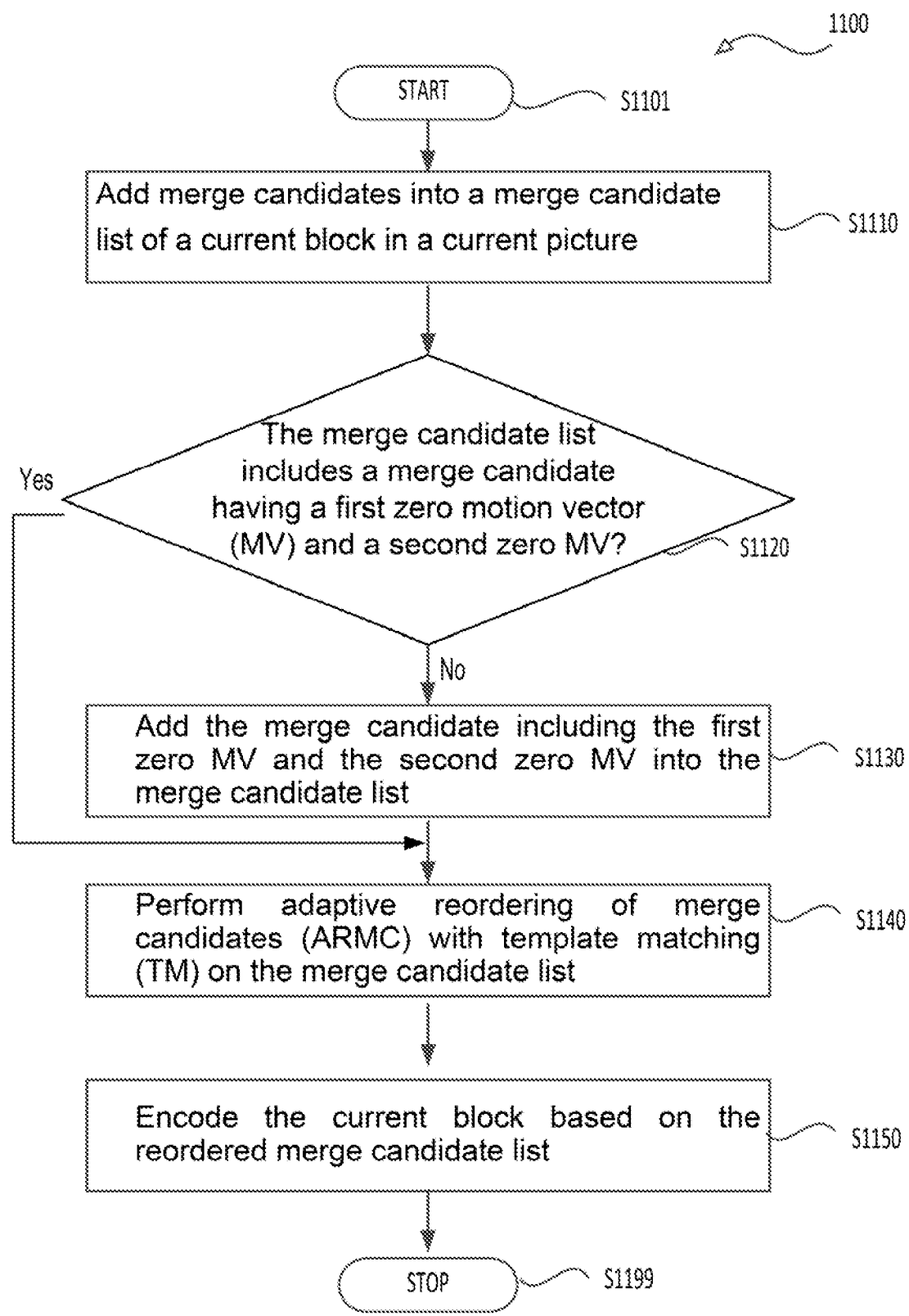
FIG. 11 shows a flow chart outlining an encoding process according to an embodiment of the disclosure.

FIG. 11 shows a flow chart outlining a process (1100) according to an embodiment of the disclosure. The process (1100) can be used in a video encoder. In various embodiments, the process (1100) is executed by processing circuitry, such as the processing circuitry that performs functions of the video encoder (103), the processing circuitry that performs functions of the video encoder (303), and the like. In some embodiments, the process (1100) is implemented in software instructions, thus when the processing circuitry executes the software instructions, the processing circuitry performs the process (1100). The process starts at (S1101) and proceeds to (S1110).

At (S1110), merge candidates can be added into a merge candidate list of a current block in a current picture. The merge candidates can include available merge candidates including one or more of (i) SMVP(s), (ii) TMVP(s), (iii) NA-MVP(s), (iv) HMVP(s), and (v) PAMVP(s).

At (S1120), whether the merge candidate list includes a merge candidate having a first zero MV and a second zero MV associated with a reference picture in a first reference picture list and a reference picture in a second reference picture list, respectively, can be determined. If the merge candidate list is determined to include the merge candidate having the first zero MV and the second zero MV, the process (1100) proceeds to (S1140). Otherwise, if the merge candidate list is determined not to include the merge candidate having the first zero MV and the second zero MV, the process (1100) proceeds to (S1130).

At (S1130), the merge candidate having the first zero MV and the second zero MV can be added to the merge candidate list, and the process (1100) proceeds to (S1140).

At (S1140), the ARMC with TM can be performed on the merge candidate list that including the merge candidate having the first zero MV and the second zero MV.

At (S1150), the current block can be encoded based on the reordered merge candidate list.

The process (1100) then proceeds to (S1199), and terminates.

The process (1100) can be suitably adapted to various scenarios and steps in the process (1100) can be adjusted accordingly. One or more of the steps in the process (1100) can be adapted, omitted, repeated, and/or combined. Any suitable order can be used to implement the process (1100). Additional step(s) can be added.

Figure 12:
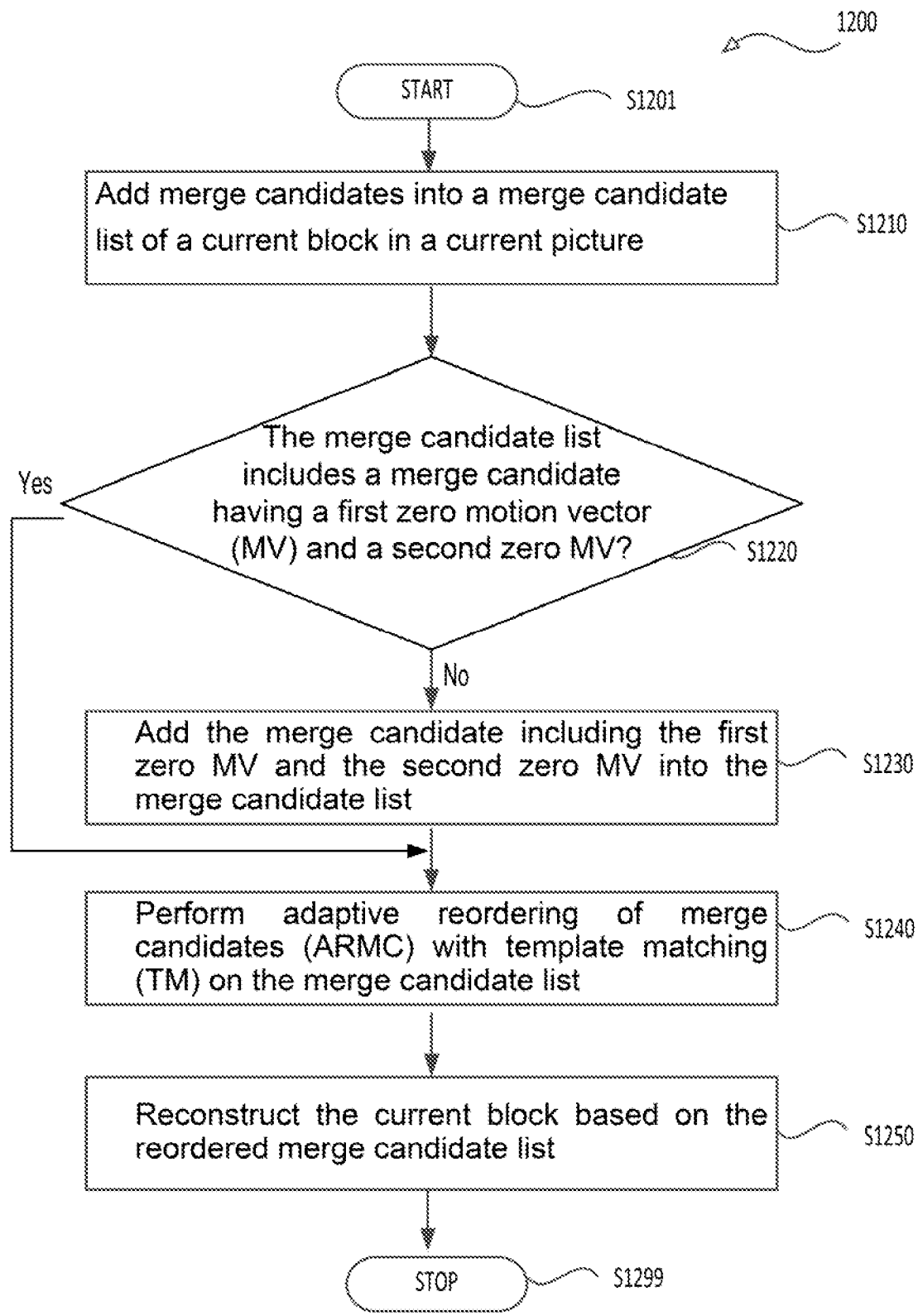
FIG. 12 shows a flow chart outlining a decoding process according to an embodiment of the disclosure.

FIG. 12 shows a flow chart outlining a process (1200) according to an embodiment of the disclosure. The process (1200) can be used in a video decoder. In various embodiments, the process (1200) is executed by processing circuitry, such as the processing circuitry that performs functions of the video decoder (110), the processing circuitry that performs functions of the video decoder (210), and the like. In some embodiments, the process (1200) is implemented in software instructions, thus when the processing circuitry executes the software instructions, the processing circuitry performs the process (1200). The process starts at (S1201) and proceeds to (S1210).

At (S1210), merge candidates can be added into a merge candidate list of a current block in a current picture. The merge candidates can include available merge candidates including one or more of (i) SMVP(s), (ii) TMVP(s), (iii) NA-MVP(s), (iv) HMVP(s), and (v) PAMVP(s).

At (S1220), whether the merge candidate list includes a merge candidate having a first zero MV and a second zero MV associated with a reference picture in a first reference picture list and a reference picture in a second reference picture list, respectively, can be determined. If the merge candidate list is determined to include the merge candidate having the first zero MV and the second zero MV, the process (1200) proceeds to (S1240). Otherwise, if the merge candidate list is determined not to include the merge candidate having the first zero MV and the second zero MV, the process (1200) proceeds to (S1230).

At (S1230), the merge candidate having the first zero MV and the second zero MV can be added to the merge candidate list, and the process (1200) proceeds to (S1240).

At (S1240), the ARMC with TM can be performed on the merge candidate list that including the merge candidate having the first zero MV and the second zero MV.

In an example, TM costs corresponding to each merge candidate in the merge candidate list including the merge candidate having the first zero MV and the second zero MV are determined. Each TM cost can be determined based on a current template of the current block and a predictor template of the respective merge candidate, such as described in FIGS. 5A, 5B, and 6. The predictor template can be based at least on a reference template in a reference picture corresponding to respective merge candidate. The merge candidate list including the first zero MV and the second zero MV can be reordered based on the determined TM costs.

In an example, a first reference index associated with the first zero MV indicates the reference picture in the first reference picture list, and a second reference index associated with the second zero MV indicates the reference picture in the second reference picture list. In an example, at least one of the first reference index or the second reference index is 0.

In an example, the first reference index is a reference index of a first reference picture in the first reference picture list. An absolute value of a POC difference between the first reference picture and the current picture is the smallest among POC differences between the current picture and reference pictures in the first reference picture list. In an example, the second reference index is a reference index of a second reference picture in the second reference picture list. An absolute value of a POC difference between the second reference picture and the current picture is the smallest among POC differences between the current picture and reference pictures in the second reference picture list.

At (S1250), the current block can be reconstructed based on the reordered merge candidate list. In an example, a merge candidate is selected from the reordered merge candidate list that includes the merge candidate having the first zero MV and the second zero MV and the current block is reconstructed based on the selected merge candidate.

The process (1200) proceeds to (S1299), and terminates.

The process (1200) can be suitably adapted to various scenarios and steps in the process (1200) can be adjusted accordingly. One or more of the steps in the process (1200) can be adapted, omitted, repeated, and/or combined. Any suitable order can be used to implement the process (1200). Additional step(s) can be added.

Embodiments in the disclosure may be used separately or combined in any order. Further, each of the methods (or embodiments), an encoder, and a decoder may be implemented by processing circuitry (e.g., one or more processors or one or more integrated circuits). In one example, the one or more processors execute a program that is stored in a non-transitory computer-readable medium.

The techniques described above, can be implemented as computer software using computer-readable instructions and physically stored in one or more computer-readable media. For example, FIG. 13 shows a computer system (1300) suitable for implementing certain embodiments of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by one or more computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

Figure 13:
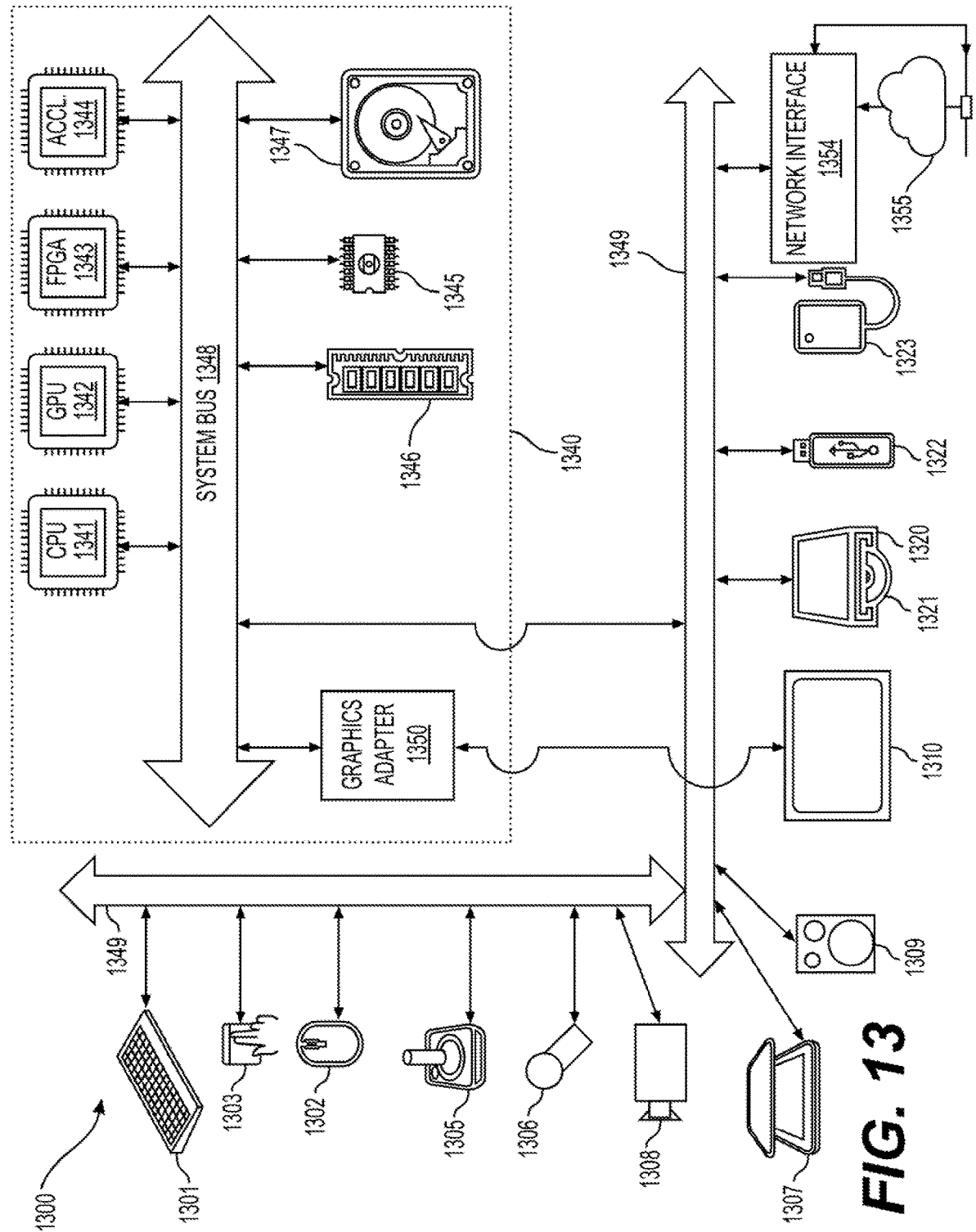
FIG. 13 is a schematic illustration of a computer system in accordance with an embodiment.

The components shown in FIG. 13 for computer system (1300) are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system (1300).

Computer system (1300) may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard (1301), mouse (1302), trackpad (1303), touch screen (1310), data-glove (not shown), joystick (1305), microphone (1306), scanner (1307), camera (1308).

Computer system (1300) may also include certain human interface output devices. Such human interface output devices may be stimulating the senses of one or more human users through, for example, tactile output, sound, light, and smell/taste. Such human interface output devices may include tactile output devices (for example tactile feedback by the touch-screen (1310), data-glove (not shown), or joystick (1305), but there can also be tactile feedback devices that do not serve as input devices), audio output devices (such as: speakers (1309), headphones (not depicted)), visual output devices (such as screens (1310) to include CRT screens, LCD screens, plasma screens, OLED screens, each with or without touch-screen input capability, each with or without tactile feedback capability-some of which may be capable to output two dimensional visual output or more than three dimensional output through means such as stereographic output; virtual-reality glasses (not depicted), holographic displays and smoke tanks (not depicted)), and printers (not depicted).

Computer system (1300) can also include human accessible storage devices and their associated media such as optical media including CD/DVD ROM/RW (1320) with CD/DVD or the like media (1321), thumb-drive (1322), removable hard drive or solid state drive (1323), legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system (1300) can also include an interface (1354) to one or more communication networks (1355). Networks can for example be wireless, wireline, optical. Networks can further be local, wide-area, metropolitan, vehicular and industrial, real-time, delay-tolerant, and so on. Examples of networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks commonly require external network interface adapters that attached to certain general purpose data ports or peripheral buses (1349) (such as, for example USB ports of the computer system (1300)); others are commonly integrated into the core of the computer system (1300) by attachment to a system bus as described below (for example Ethernet interface into a PC computer system or cellular network interface into a smartphone computer system). Using any of these networks, computer system (1300) can communicate with other entities. Such communication can be uni-directional, receive only (for example, broadcast TV), uni-directional send-only (for example CANbus to certain CANbus devices), or bi-directional, for example to other computer systems using local or wide area digital networks. Certain protocols and protocol stacks can be used on each of those networks and network interfaces as described above.

Aforementioned human interface devices, human-accessible storage devices, and network interfaces can be attached to a core (1340) of the computer system (1300).

The core (1340) can include one or more Central Processing Units (CPU) (1341), Graphics Processing Units (GPU) (1342), specialized programmable processing units in the form of Field Programmable Gate Areas (FPGA) (1343), hardware accelerators for certain tasks (1344), graphics adapters (1350), and so forth. These devices, along with Read-only memory (ROM) (1345), Random-access memory (1346), internal mass storage such as internal non-user accessible hard drives, SSDs, and the like (1347), may be connected through a system bus (1348). In some computer systems, the system bus (1348) can be accessible in the form of one or more physical plugs to enable extensions by additional CPUs, GPU, and the like. The peripheral devices can be attached either directly to the core's system bus (1348), or through a peripheral bus (1349). In an example, the screen (1310) can be connected to the graphics adapter (1350). Architectures for a peripheral bus include PCI, USB, and the like.

CPUs (1341), GPUs (1342), FPGAs (1343), and accelerators (1344) can execute certain instructions that, in combination, can make up the aforementioned computer code. That computer code can be stored in ROM (1345) or RAM (1346). Transitional data can also be stored in RAM (1346), whereas permanent data can be stored for example, in the internal mass storage (1347). Fast storage and retrieve to any of the memory devices can be enabled through the use of cache memory, that can be closely associated with one or more CPU (1341), GPU (1342), mass storage (1347), ROM (1345), RAM (1346), and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture (1300), and specifically the core (1340) can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core (1340) that are of non-transitory nature, such as core-internal mass storage (1347) or ROM (1345). The software implementing various embodiments of the present disclosure can be stored in such devices and executed by core (1340). A computer-readable medium can include one or more memory devices or chips, according to particular needs. The software can cause the core (1340) and specifically the processors therein (including CPU, GPU, FPGA, and the like) to execute particular processes or particular parts of particular processes described herein, including defining data structures stored in RAM (1346) and modifying such data structures according to the processes defined by the software. In addition or as an alternative, the computer system can provide functionality as a result of logic hardwired or otherwise embodied in a circuit (for example: accelerator (1344)), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

What is claimed is:

1. A method for video decoding, comprising:
   receiving a video bitstream comprising a current block in a current picture;
   adding merge candidates into a merge candidate list of the current block in the current picture, the merge candidates being available merge candidates including one or more of (i) at least one spatial motion vector predictor (MVP) (SMVP), (ii) at least one temporal MVP (TMVP), (iii) at least one non-adjacent MVP (NA-MVP), (iv) at least one history-based MVP (HMVP), and (v) at least one pairwise average MVP (PAMVP);
   determining whether the merge candidate list includes a merge candidate that has a zero motion vector (zero MV);
   when no merge candidate in the merge candidate list has the zero MV, adding a merge candidate having the zero MV to the merge candidate list, at least one reference index of the added merge candidate having the zero MV being 0, the at least one reference index being 0 indicating a first reference picture in one of (i) a first reference picture list L0 and (ii) a second reference picture list L1;
   reordering the merge candidates including the merge candidate having the zero MV in the merge candidate list using template matching (TM); and
   reconstructing the current block based on the reordered merge candidate list.

2. The method of claim 1, wherein the reconstructing comprises:
   selecting a merge candidate from the reordered merge candidate list that includes the merge candidate having the zero MV; and
   reconstructing the current block based on the selected merge candidate.

3. The method of claim 1, wherein the reordering comprises:
   determining TM costs corresponding to each merge candidate in the merge candidate list including the merge candidate having the zero MV, each TM cost being determined based on a current template of the current block and at least one reference template in at least one reference picture corresponding to a respective merge candidate, the at least one reference picture corresponding to the merge candidate having the zero MV including the first reference picture; and
   reordering the merge candidate list including the merge candidate having the zero MV based on the determined TM costs.

4. The method of claim 3, wherein the determining whether the merge candidate list includes the merge candidate that has the zero MV comprises:
- determining that the merge candidate list includes the merge candidate having the zero MV when one of conditions is satisfied, the conditions being
  - (i) one of the merge candidates in the merge candidate list being a merge candidate for uni-prediction having the zero MV associated with a reference picture in one of the first reference picture list L0 and the second reference picture list L1, and
  - (ii) one of the merge candidates in the merge candidate list being a merge candidate for bi-prediction that has (a) the zero MV associated with the reference picture in the first reference picture list L0 and (b) another zero MV associated with a reference picture in the second reference picture list L1; and
- determining that no merge candidate in the merge candidate list has the zero MV when none of the conditions is satisfied.

5. The method of claim 3, wherein the adding the merge candidate having the zero MV comprises:
- adding the merge candidate having the zero MV to the merge candidate list, an absolute value of a picture order count (POC) difference between the first reference picture and the current picture being the smallest among POC differences between the current picture and reference pictures of the current picture.

6. The method of claim 3, wherein the adding the merge candidate having the zero MV comprises:
- adding the merge candidate having the zero MV and another zero MV to the merge candidate list, the at least one reference index including (i) a first reference index associated with the zero MV indicating the first reference picture in the one of the first reference picture list L0 and the second reference picture list L1, and a second reference index associated with the other zero MV indicating a second reference picture in the other of the first reference picture list L0 and the second reference picture list L1, the current picture being a bi-predicted picture, the first reference picture and the second reference picture being available.

7. A method for video decoding, comprising:
- adding merge candidates into a merge candidate list of a current block in a current picture, the merge candidates being available merge candidates including one or more of (i) at least one spatial motion vector predictor (MVP) (SMVP), (ii) at least one temporal MVP (TMVP), (iii) at least one non-adjacent MVP (NA-MVP), (iv) at least one history-based MVP (HMVP), or (v) at least one pairwise average MVP (PAMVP);
- determining whether the merge candidate list includes a merge candidate having a first zero motion vector (MV) and a second zero MV associated with a first reference picture in a first reference picture list L0 and a second reference picture in a second reference picture list L1, respectively;
- when no merge candidate in the merge candidate list has the first zero MV and the second zero MV, adding the merge candidate having the first zero MV and the second zero MV to the merge candidate list, a first reference index associated with the first zero MV indicating the first reference picture in the first reference picture list L0, and a second reference index associated with the second zero MV indicating the second reference picture in the second reference picture list L1, at least one of the first reference index and the second reference index being 0;
- reordering the merge candidates including the merge candidate having the first zero MV and the second zero MV in the merge candidate list using template matching (TM); and
- reconstructing the current block based on the reordered merge candidate list.

8. The method of claim 7, wherein the reconstructing comprises:
- selecting a merge candidate based on the reordered merge candidate list including the first zero MV and the second zero MV; and
- reconstructing the current block based on the selected merge candidate.

9. The method of claim 7, wherein the reordering comprises:
- determining TM costs corresponding to each merge candidate in the merge candidate list including the merge candidate having the first zero MV and the second zero MV, each TM cost being determined based on a current template of the current block and at least one reference template in at least one reference picture corresponding to a respective merge candidate, the at least one reference picture corresponding to the merge candidate having the first zero MV and the second zero MV including the first reference picture and the second reference picture; and
- reordering the merge candidate list including the merge candidate having the first zero MV and the second zero MV based on the determined TM costs.

10. The method of claim 7, wherein
- an absolute value of a picture order count (POC) difference between the first reference picture and the current picture being is the smallest among POC differences between the current picture and reference pictures in the first reference picture list L0, and/or
- an absolute value of a POC difference between the second reference picture and the current picture is the smallest among POC differences between the current picture and reference pictures in the second reference picture list L1.

11. The method of claim 1, wherein the at least one reference index of the added merge candidate comprises a first reference index and a second reference index, the first reference index is 0 and indicates the first reference picture in the first reference picture list L0, and the second reference index is 0 and indicates a second reference picture in the second reference picture list L1, the first reference picture list L0 being different from the second reference picture list L1.

12. A method for video encoding, comprising:
- adding merge candidates into a merge candidate list of a current block in a current picture, the merge candidates being available merge candidates including one or more of (i) at least one spatial motion vector predictor (MVP) (SMVP), (ii) at least one temporal MVP (TMVP), (iii) at least one non-adjacent MVP (NA-MVP), (iv) at least one history-based MVP (HMVP), and (v) at least one pairwise average MVP (PAMVP);
- determining whether the merge candidate list includes a merge candidate that has a zero motion vector (zero MV);
- when no merge candidate in the merge candidate list has the zero MV, adding a merge candidate having the zero MV to the merge candidate list, at least one reference index of the added merge candidate having the zero MV being 0, the at least one reference index being 0 indicating a first reference picture in one of (i) a first reference picture list L0 and (ii) a second reference picture list L1;

reordering the merge candidates including the merge candidate having the zero MV in the merge candidate list using template matching (TM); and encoding, in a video bitstream, the current block based on the reordered merge candidate list.

13. The method of claim 12, wherein the encoding comprises:

selecting a merge candidate from the reordered merge candidate list that includes the merge candidate having the zero MV; and encoding the current block based on the selected merge candidate.

14. The method of claim 12, wherein the reordering comprises:

determining TM costs corresponding to each merge candidate in the merge candidate list including the merge candidate having the zero MV, each TM cost being determined based on a current template of the current block and at least one reference template in at least one reference picture corresponding to a respective merge candidate, the at least one reference picture corresponding to the merge candidate having the zero MV including the first reference picture; and reordering the merge candidate list including the merge candidate having the zero MV based on the determined TM costs.

15. The method of claim 14, wherein the adding the merge candidate having the zero MV comprises:

adding the merge candidate having the zero MV to the merge candidate list, an absolute value of a picture order count (POC) difference between the first reference picture and the current picture being the smallest among POC differences between the current picture and reference pictures of the current picture.

\* \* \* \* \*